US012375976B2

(12) United States Patent
Damnjanovic et al.

(10) Patent No.: US 12,375,976 B2
(45) Date of Patent: Jul. 29, 2025

(54) L1/L2 INTER-CELL MOBILITY AND CA

(71) Applicant: QUALCOMM Incorporated, San Diego, CA (US)

(72) Inventors: Jelena Damnjanovic, Del Mar, CA (US); Shanyu Zhou, San Diego, CA (US); Aleksandar Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 461 days.

(21) Appl. No.: 17/811,567

(22) Filed: Jul. 8, 2022

(65) Prior Publication Data

US 2023/0354109 A1  Nov. 2, 2023

Related U.S. Application Data

(60) Provisional application No. 63/363,936, filed on Apr. 29, 2022.

(51) Int. Cl.
*H04W 36/00* (2009.01)
*H04W 8/06* (2009.01)

(52) U.S. Cl.
CPC ......... *H04W 36/0027* (2013.01); *H04W 8/06* (2013.01); *H04W 36/0016* (2013.01)

(58) Field of Classification Search
CPC ............. H04W 36/0027; H04W 8/06; H04W 36/0016
See application file for complete search history.

(56) References Cited

U.S. PATENT DOCUMENTS

| 2022/0014983 | A1* | 1/2022 | Zhou | H04W 76/15 |
| 2022/0110109 | A1* | 4/2022 | Tsai | H04L 5/0098 |
| 2022/0159530 | A1* | 5/2022 | Kim | H04W 36/362 |
| 2023/0086614 | A1* | 3/2023 | Kim | H04W 36/00838 |
| | | | | 370/331 |

OTHER PUBLICATIONS

APPLE: "L1/L2-Centric Inter-Cell Mobility", 3GPP TSG-RAN WG2 Meeting #114 bis electronic, R2-2105103, 3rd Generation Partnership Project (3GPP), Mobile Competence Centre, 650, Route Des Lucioles, F-06921 Sophia-Antipolis Cedex, France, vol. RAN WG2, No. electronic, May 19, 2021-May 27, 2021, 3 Pages, May 11, 2021, XP052006797, p. 1-p. 3.
International Search Report and Written Opinion—PCT/US2023/020622—ISA/EPO—Aug. 8, 2023.
Qualcomm Incorporated: "L1/L2 Mobility—General Concepts and Configuration", 3GPP TSG-RAN WG2 Meeting #119-e, R2-2207340, 3rd Generation Partnership Project, Mobile Competence Centre, 650, Route Des Lucioles, F-06921 Sophia-Antipolis Cedex, France, vol. RAN WG2, No. Electronic, Aug. 15, 2022-Aug. 26, 2022, 6 Pages, Aug. 8, 2022, XP052260662, p. 4, figure 4.

* cited by examiner

*Primary Examiner* — Ajay Cattungal
(74) *Attorney, Agent, or Firm* — Procopio, Cory, Hargreaves & Savitch

(57) ABSTRACT

Apparatus, methods, and computer program products for L1 or L2 mobility are provided. An example method may include receiving a carrier aggregation (CA) configuration associated with a L1 or L2 mobility configuration from a network node, the L1 or L2 mobility configuration including primary cell (PCell) configurations for multiple cells. The example method may further include receiving at least one activation or deactivation of one of the PCell configurations from the network node.

30 Claims, 16 Drawing Sheets

L1/L2 INTER-CELL MOBILITY AND CA

CROSS REFERENCE TO RELATED APPLICATION(S)

This application claims the benefit of and priority to U.S. Provisional Application Ser. No. 63/363,936, entitled "L1/L2 INTER-CELL MOBILITY AND CA" and filed on Apr. 29, 2022, which is expressly incorporated by reference herein in its entirety.

TECHNICAL FIELD

The present disclosure relates generally to communication systems, and more particularly, to wireless communication systems with carrier aggregation (CA) and layer 1 (L1) or layer 2 (L2) mobility.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to receive a carrier aggregation (CA) configuration associated with a layer 1 (L1) or layer 2 (L2) mobility configuration from a network node, the L1 or L2 mobility configuration including primary cell (PCell) configurations or special cell (spCell) configurations for multiple cells. The memory and the at least one processor coupled to the memory may be further configured to receive at least one activation or deactivation of one of the PCell configurations from the network node. A spCell may be PCell of master cell group (MCG) or primary secondary cell (PSCell) of secondary cell group (SCG).

In some aspects, the at least one activation or deactivation includes a secondary cell (SCell) activation or deactivation activating or deactivating an SCell for a data flow or a control flow or a PCell activation or deactivation, the SCell activation or deactivation being separate from the PCell activation or deactivation. In some aspects, the PCell activation or deactivation activates an activated SCell in a L1 or L2 mobility activated cell set to be a PCell. In some aspects, the PCell activation or deactivation is received via medium access control (MAC) control element (MAC-CE) or downlink control information (DCI), wherein the MAC-CE or the DCI is associated with a logical channel identifier (LCID) associated with L1 or L2 PCell activation, and including: a first pointer to a cell ID associated with the activated SCell or a first bit corresponding with the activated SCell in a bitmap, a second pointer to a special cell (spCell) configuration associated with the activated SCell or a second bit corresponding with the spCell configuration in the bitmap, or one or more transmission configuration indicator (TCI) states to activate for the activated SCell. In some aspects, the MAC-CE further includes a tracking reference signal (TRS) identifier associated with the one or more TCI states and a L1 measurement configuration identifier associated with the one or more cells being deactivated by the PCell activation or deactivation.

In some aspects, the at least one activation or deactivation includes at least one of: a first activation or deactivation associated with an L1 or L2 mobility activated cell set or an L1 or L2 mobility deactivated cell set or a second activation or deactivation associated with one or more cells not configured for L1 or L2 mobility. In some aspects, the first activation or deactivation jointly controls SCell activation or deactivation activating or deactivating an SCell for a data flow or a control flow and PCell activation and deactivation activating the activated SCell in the L1 or L2 mobility activated cell set to be a PCell. In some aspects, the first activation or deactivation is received via medium access control (MAC) control element (MAC-CE) associated with a logical channel identifier (LCID) associated with L1 or L2 PCell activation, and including: a first pointer to a cell ID associated with the activated SCell or a first bit corresponding with the activated SCell in a bitmap, a second pointer to a special cell (spCell) configuration associated with the activated SCell or a second bit corresponding with the spCell configuration in the bitmap, or one or more transmission configuration indicator (TCI) states to activate for the activated SCell. In some aspects, the MAC-CE further includes an index representing a list of cells including the activated SCell, each entry of the index associated with one cell of the list of cells and represent whether the one cell is activated or deactivated. In some aspects, the MAC-CE further includes a tracking reference signal (TRS) identifier associated with the one or more TCI states and a L1 measurement configuration identifier associated with the one or more cells being deactivated by the PCell activation or deactivation.

In another aspect of the disclosure, a method, a computer-readable medium, and an apparatus at a network node are provided. The apparatus may include a memory and at least one processor coupled to the memory. The memory and the at least one processor coupled to the memory may be configured to transmit a CA configuration associated with a L1 or L2 mobility configuration for a UE, the L1 or L2 mobility configuration including PCell/spCell configurations for multiple cell. The memory and the at least one processor coupled to the memory may be further configured to transmit at least one activation or deactivation for the UE of one of the spCell configurations.

In some aspects, the at least one activation or deactivation includes a secondary cell (SCell) activation or deactivation activating or deactivating an SCell for a data flow or a control flow or a PCell activation or deactivation, the SCell activation or deactivation being separate from the PCell activation or deactivation. In some aspects, the PCell activation or deactivation activates an activated SCell in a L1 or L2 mobility activated cell set to be a PCell. In some aspects, the PCell activation or deactivation is received via medium access control (MAC) control element (MAC-CE) or downlink control information (DCI), wherein the MAC-CE or the DCI is associated with a logical channel identifier (LCID) associated with L1 or L2 PCell activation, and including: a first pointer to a cell ID associated with the activated SCell or a first bit corresponding with the activated SCell in a bitmap, a second pointer to a special cell (spCell) configuration associated with the activated SCell or a second bit corresponding with the spCell configuration in the bitmap, or one or more transmission configuration indicator (TCI) states to activate for the activated SCell. In some aspects, the MAC-CE further includes a tracking reference signal (TRS) identifier associated with the one or more TCI states and a L1 measurement configuration identifier associated with the one or more cells being deactivated by the PCell activation or deactivation.

In some aspects, the at least one activation or deactivation includes at least one of: a first activation or deactivation associated with an L1 or L2 mobility activated cell set or an L1 or L2 mobility deactivated cell set or a second activation or deactivation associated with one or more cells not configured for L1 or L2 mobility. In some aspects, the first activation or deactivation jointly controls SCell activation or deactivation activating or deactivating an SCell for a data flow or a control flow and PCell activation and deactivation activating the activated SCell in the L1 or L2 mobility activated cell set to be a PCell. In some aspects, the first activation or deactivation is received via medium access control (MAC) control element (MAC-CE) associated with a logical channel identifier (LCID) associated with L1 or L2 PCell activation, and including: a first pointer to a cell ID associated with the activated SCell or a first bit corresponding with the activated SCell in a bitmap, a second pointer to a special cell (spCell) configuration associated with the activated SCell or a second bit corresponding with the spCell configuration in the bitmap, or one or more transmission configuration indicator (TCI) states to activate for the activated SCell. In some aspects, the MAC-CE further includes an index representing a list of cells including the activated SCell, each entry of the index associated with one cell of the list of cells and represent whether the one cell is activated or deactivated. In some aspects, the MAC-CE further includes a tracking reference signal (TRS) identifier associated with the one or more TCI states and a L1 measurement configuration identifier associated with the one or more cells being deactivated by the PCell activation or deactivation.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
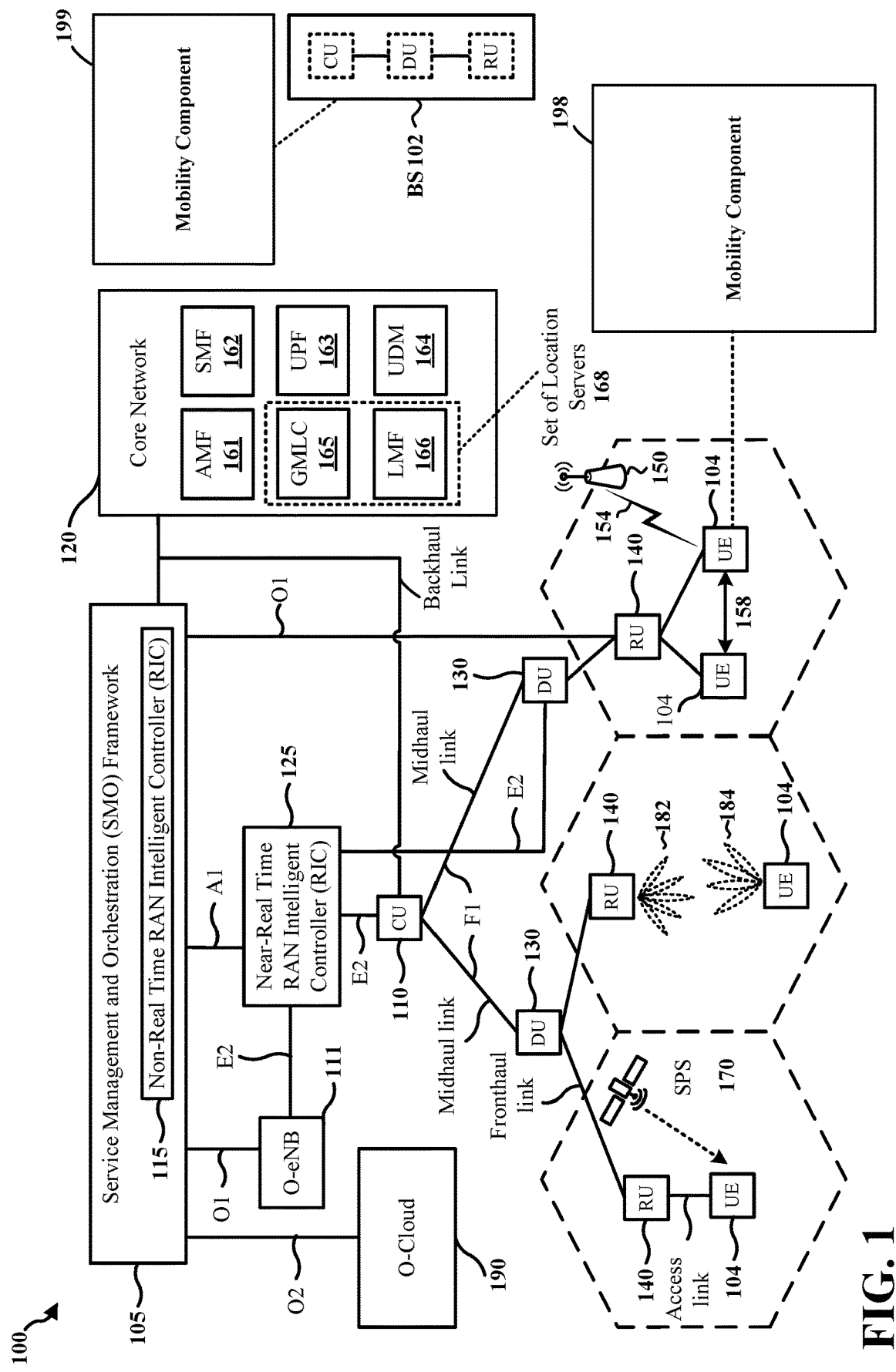
FIG. 1 is a diagram illustrating an example of a wireless communications system and an access network.

Example aspects may enable L1/L2 based inter-cell mobility that may co-exist with carrier aggregation (CA). Example aspects may provide configuration mechanisms, cell activation or deactivation, and associated signaling to enable L1/L2 mobility with CA to facilitate more efficient and robust mobility management.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a mobility component 198. In some aspects, the mobility component 198 may be configured to receive a carrier aggregation (CA) configuration associated with a layer 1 (L1) or layer 2 (L2) mobility configuration from a network node, the L1/L2 mobility configuration including primary cell (PCell) configurations for multiple cells. In some aspects, the mobility component 198 may be further configured to receive at least one activation or deactivation of one of the PCell configurations from the network node.

In certain aspects, the base station 102 may include a mobility component 199. In some aspects, the mobility component 199 may be configured to transmit a CA configuration associated with a L1/L2 mobility configuration for a UE, the L1/L2 mobility configuration including PCell configurations for multiple cell. In some aspects, the mobility component 199 may be further configured to transmit at least one activation or deactivation for the UE of one of the PCell configurations.

Figure 2:
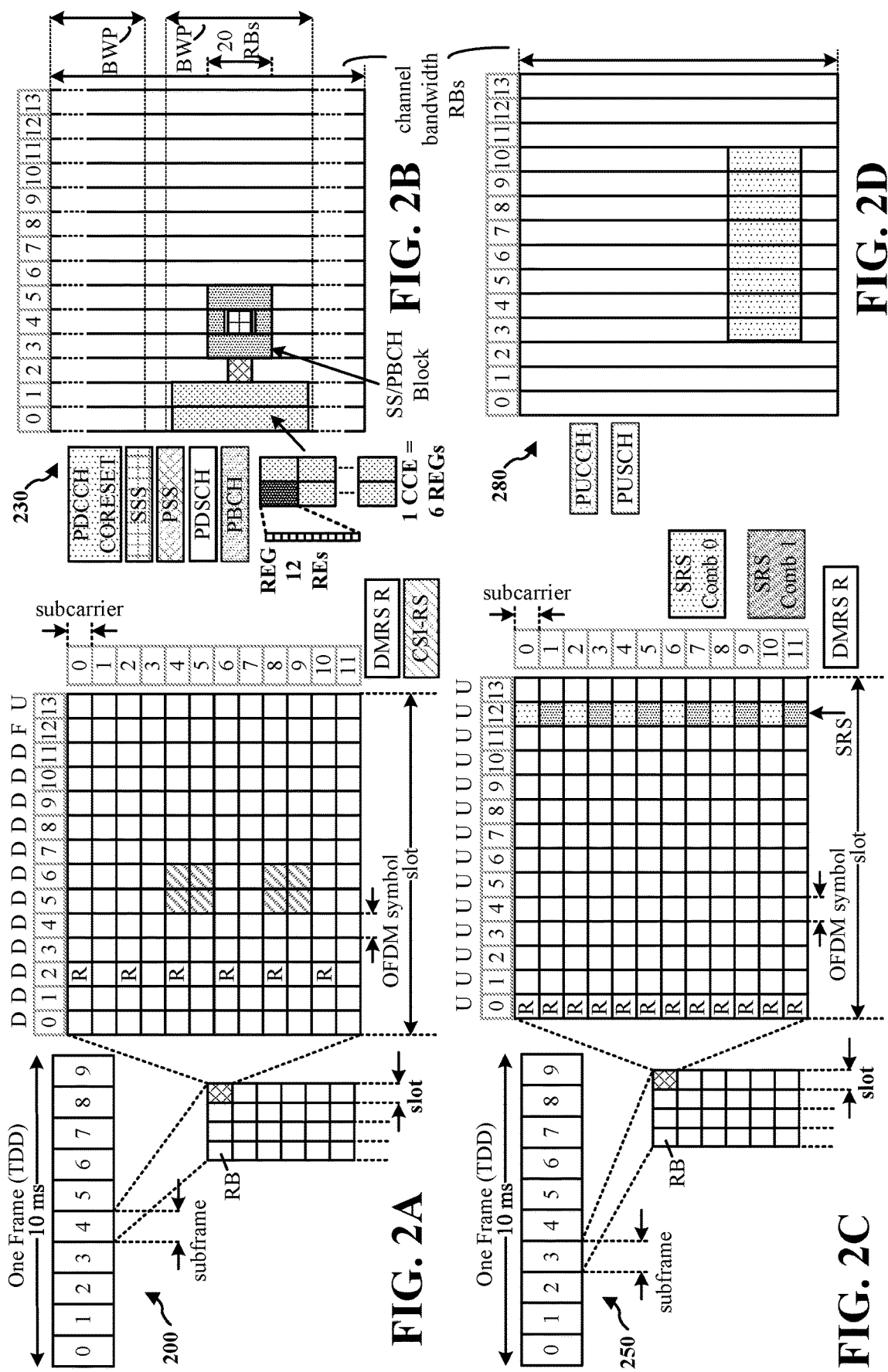
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
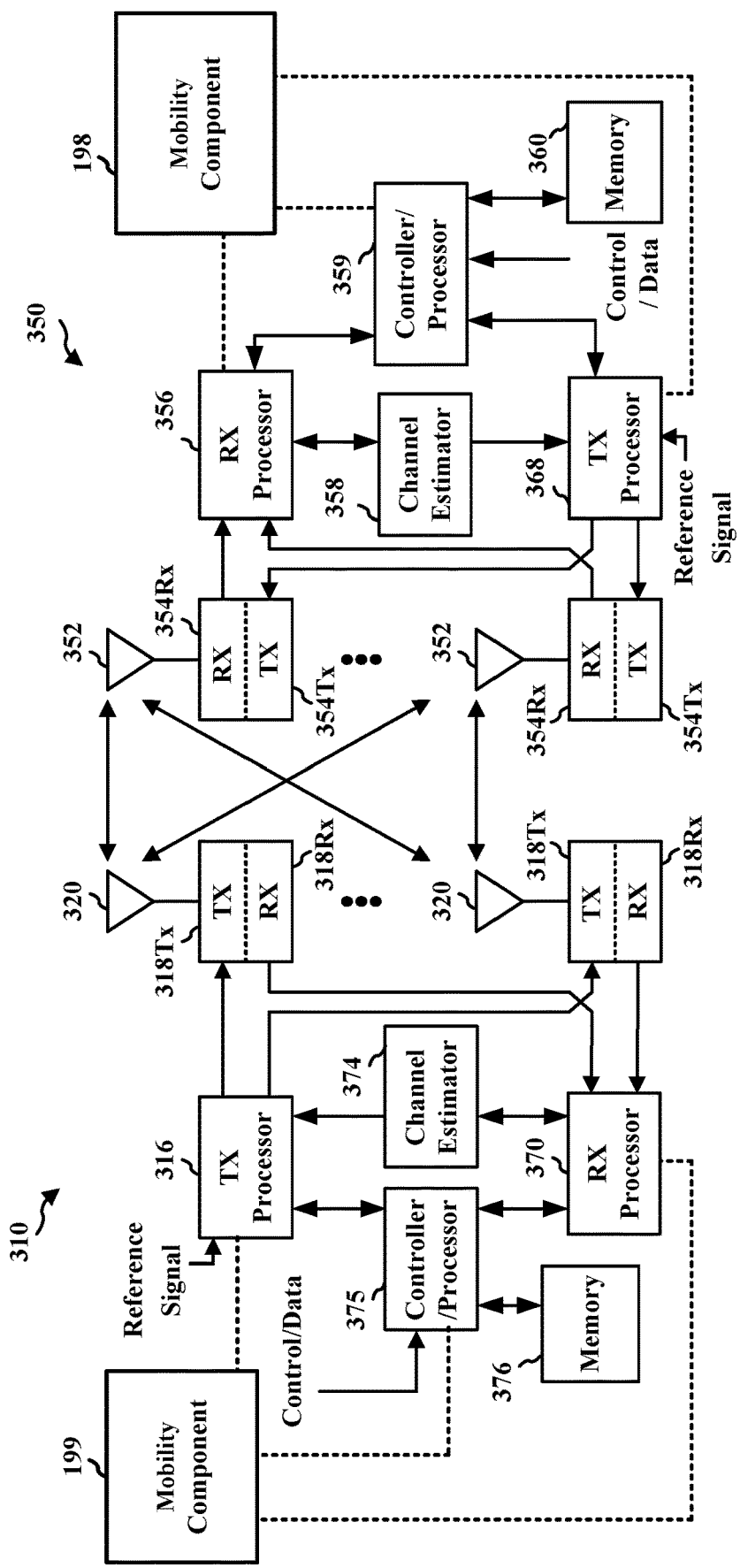
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with mobility component 198 of FIG. 1.

At least one of the TX processor 316, the RX processor 370, and the controller/processor 375 may be configured to perform aspects in connection with mobility component 199 of FIG. 1.

A network may be in communication with a UE based on one or more beams (spatial filters). For example, a base station of the network may transmit a beamformed signal to a UE in one or more directions that correspond with one or more beams. The base station and the UE may perform beam training to determine the best receive and transmit directions for the base station and the UE.

In response to different conditions, beams may be switched. For example, a transmission configuration indication (TCI) state change may be transmitted by a base station so that the UE may switch to a new beam for the TCI state. The TCI state change may cause the UE to find the best UE receive beam corresponding to the TCI state from the base station, and switch to such beam. Switching beams may allow for enhanced or improved connection between the UE and the base station by ensuring that the transmitter and receiver use the same configured set of beams for communication. A TCI state may include quasi co-location (QCL) information that the UE can use to derive timing/frequency error and/or transmission/reception spatial filtering for transmitting/receiving a signal. Two antenna ports are said to be quasi co-located if properties of the channel over which a symbol on one antenna port is conveyed can be inferred from the channel over which a symbol on the other antenna port is conveyed. The base station may indicate a TCI state to the UE as a transmission configuration that indicates QCL relationships between one signal (e.g., a reference signal) and the signal to be transmitted/received. For example, a TCI state may indicate a QCL relationship between DL RS s in one RS set and PDSCH/PDCCH DM-RS ports. TCI states can provide information about different beam selections for the UE to use for transmitting/receiving various signals. Under a unified TCI framework, different types of common TCI states may be indicated. For example, a type 1 TCI may be a joint DL/UL common TCI state to indicate a common beam for at least one DL channel or RS and at least one UL channel or RS. A type 2 TCI may be a separate DL (e.g., separate from UL) common TCI state to indicate a common beam for more than one DL channel or RS. A type 3 TCI may be a separate UL common TCI state to indicate a common beam for more than one UL channel/RS. A type 4 TCI may be a separate DL single channel or RS TCI state to indicate a beam for a single DL channel or RS. A type 5 TCI may be a separate UL single channel or RS TCI state to indicate a beam for a single UL channel or RS. A type 6 TCI may include UL spatial relation information (e.g., such as sounding reference signal (SRS) resource indicator (SRI)) to indicate a beam for a single UL channel or RS. An example RS may be an SSB, a tracking reference signal (TRS) and associated CSI-RS for tracking, a CSI-RS for beam management, a CSI-RS for CQI management, a DM-RS associated with non-UE-dedicated reception on PDSCH and a subset (which may be a full set) of control resource sets (CORESETs), or the like. A TCI state may be defined to represent at least one source RS to provide a reference (e.g., UE assumption) for determining quasi-co-location (QCL) or spatial filters. For example, a TCI state may define a QCL assumption between a source RS and a target RS.

As another example, a spatial relation change, such as a spatial relation update, may trigger the UE to switch beams. Beamforming may be applied to uplink channels, such as but not limited to PUCCH. Beamforming may be based on configuring one or more spatial relations between the uplink and downlink signals. Spatial relation may indicate that a UE may transmit the uplink signal using the same beam as it used for receiving the corresponding downlink signal.

As another example, a base station may change a pathloss reference signal configuration that the UE uses to determine power control for uplink transmissions, such as SRS, PUCCH, and/or PUSCH. In response to the change in the pathloss reference signal, the UE 402 may switch to a new beam.

Figure 4B:
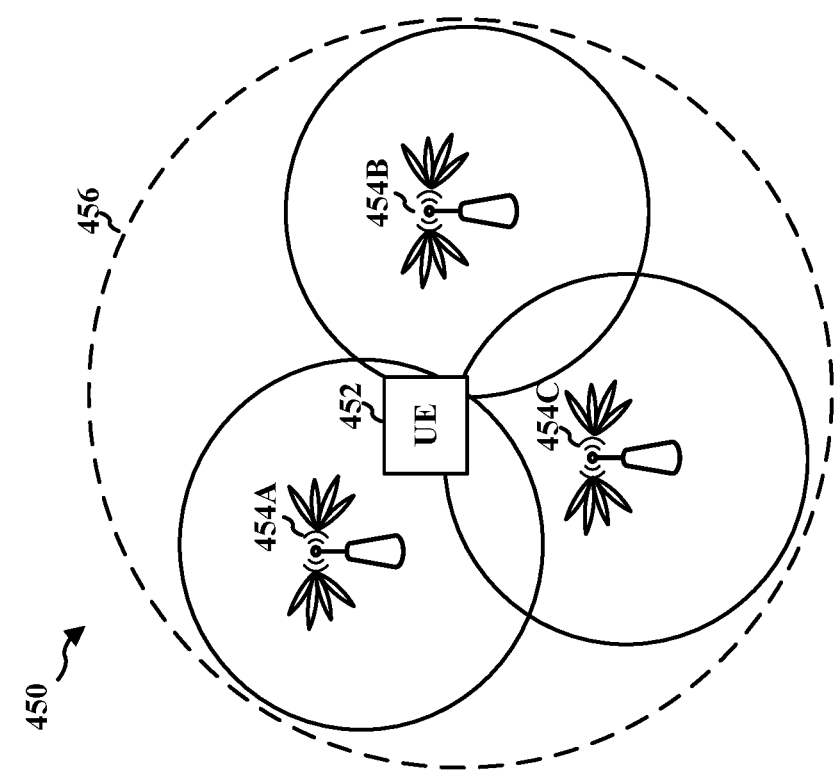
FIG. 4B is a diagram illustrating example inter-cell beam management.
Figure 4A:
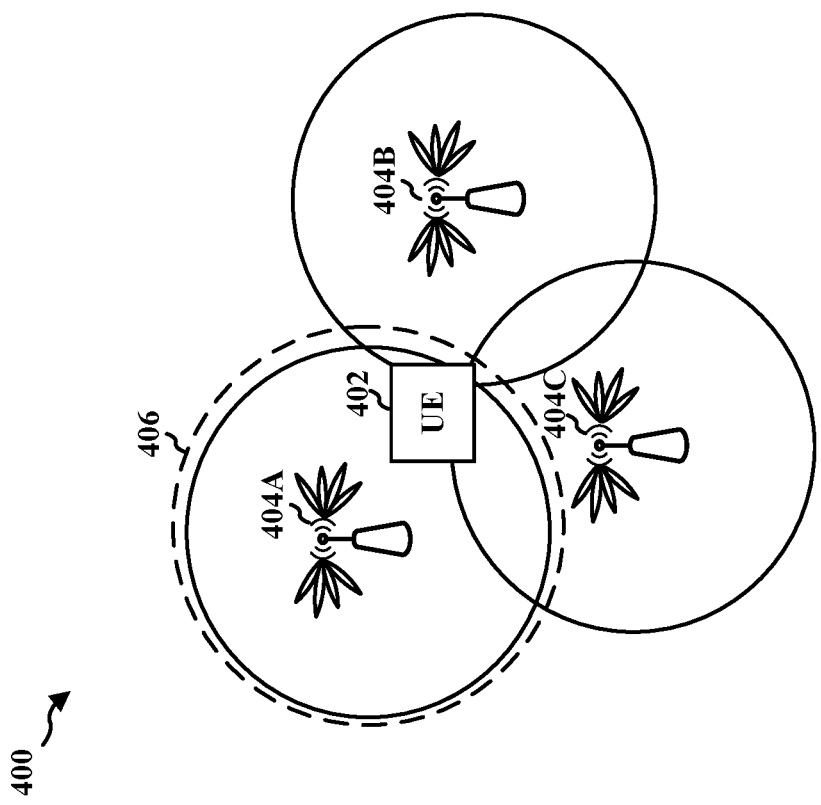
FIG. 4A is a diagram illustrating example beam management.

Different procedures for managing and controlling beam may be collectively referred to as "beam management." The process of selecting a beam to switch to for data channels or control channels may be referred to as "beam selection." In some wireless communication systems, beam selection for data channels or control channels may be limited to beams within a same physical cell identifier (ID) (PCI). A PCI may be associated with a TRP. FIG. 4A is a diagram 400 illustrating example beam management. As illustrated in FIG. 4A, for a UE 402, beam selection 406 may be limited to beams within the PCI 404A and beams associated with the PCI 404B and the PCI 404C may not be used. As an example, each of the PCI 404A, the PCI 404B, and the PCI 404C may be associated with a different TRP.

By way of example, a UE may encounter two types of mobility—cell-level mobility and beam-level mobility (which may be beam-based mobility). For cell-level mobility, a UE may experience an inter-base station handover. In some wireless communication systems, for beam-level mobility, as previously explained, switching of beams may occur within a same base station.

In some wireless communication systems, inter-cell beam management may be based on beam-based mobility where the indicated beam may be from a TRP with different PCI with regard to the serving cell. Benefits of inter-cell beam management based on beam-based mobility may include more robustness against blocking, more opportunities for higher rank for subscriber data management (SDM) across different cells, and in general more efficient communication between a UE and the network. FIG. 4B is a diagram 450 illustrating example inter-cell beam management. As illustrated in FIG. 4B, for a UE 452, beam selection 456 may be based on beams within the PCI 454A and beams associated with the PCI 454B and the PCI 454C. As an example, each of the PCI 454A, the PCI 454B, and the PCI 454C may be associated with a different TRP.

As an example, inter-cell beam management based on beam-based mobility may be facilitated by L1 and/or L2 signaling such as UE-dedicated channels/RSs which may be associated with a switch to a TRP with different PCI according to downlink control information (DCI) or medium access control (MAC) control element (MAC-CE) based unified TCI update. As used herein, such mobility may be referred to as L1/L2 mobility. In some wireless communication systems PCell change using L1/L2 signaling is not supported. A UE may be in the coverage of the serving cell when communicating with TRP with different PCI (no support for a serving cell change).

In some aspects, the network may configure a set of cells for L1/L2 mobility. The set of cells for L1/L2 mobility may be referred to as L1/L2 mobility configured cell set. The L1/L2 mobility configured cell set may include an L1/L2 mobility activated cell set (which may also be referred to as a L1/L2 activated mobility cell set) and an L1/L2 mobility deactivated cell set (which may also be referred to as a deactivated L1/L2 mobility cell set). The L1/L2 mobility activated cell set may be a group of cells in the L1/L2 mobility configured cell set that are activated and may be readily used for data and control transfer. The L1/L2 mobility deactivated cell set (which may be a L1/L2 mobility candidate cell set) may be a group of cells in the configured set that are configured for the UE yet deactivated and may be activated by L1/L2 signaling. Once activated, a deactivated cell may be used for data and control transfer.

For mobility management of the activated cell set, L1/L2 signaling may be used to activate/deactivate cells in the L1/L2 mobility configured cell set and to select beams within the activated cells (of the activated cell set). As the UE moves, cells from the L1/L2 mobility configured cell set may be deactivated and activated by L1/L2 signaling based on signal quality (e.g., based on measurements), loading, or the like. Example measurements may include cell coverage measurements represented by Radio Signal Received Power (RSRP), and quality represented by Radio Signal Received Quality (RSRQ), or other measurements that the UE performs on signals from the base station. In some aspects, the measurements may be L1 measurements such as one or more of an RSRP, an RSRQ, a received signal strength indicator (RSSI), or a signal to noise and interference ratio (SINR) measurement of various signals, such as a SSB, a PSS, an SSS, a broadcast channel (BCH), a DM-RS, CSI-RS, or the like.

Figure 5:
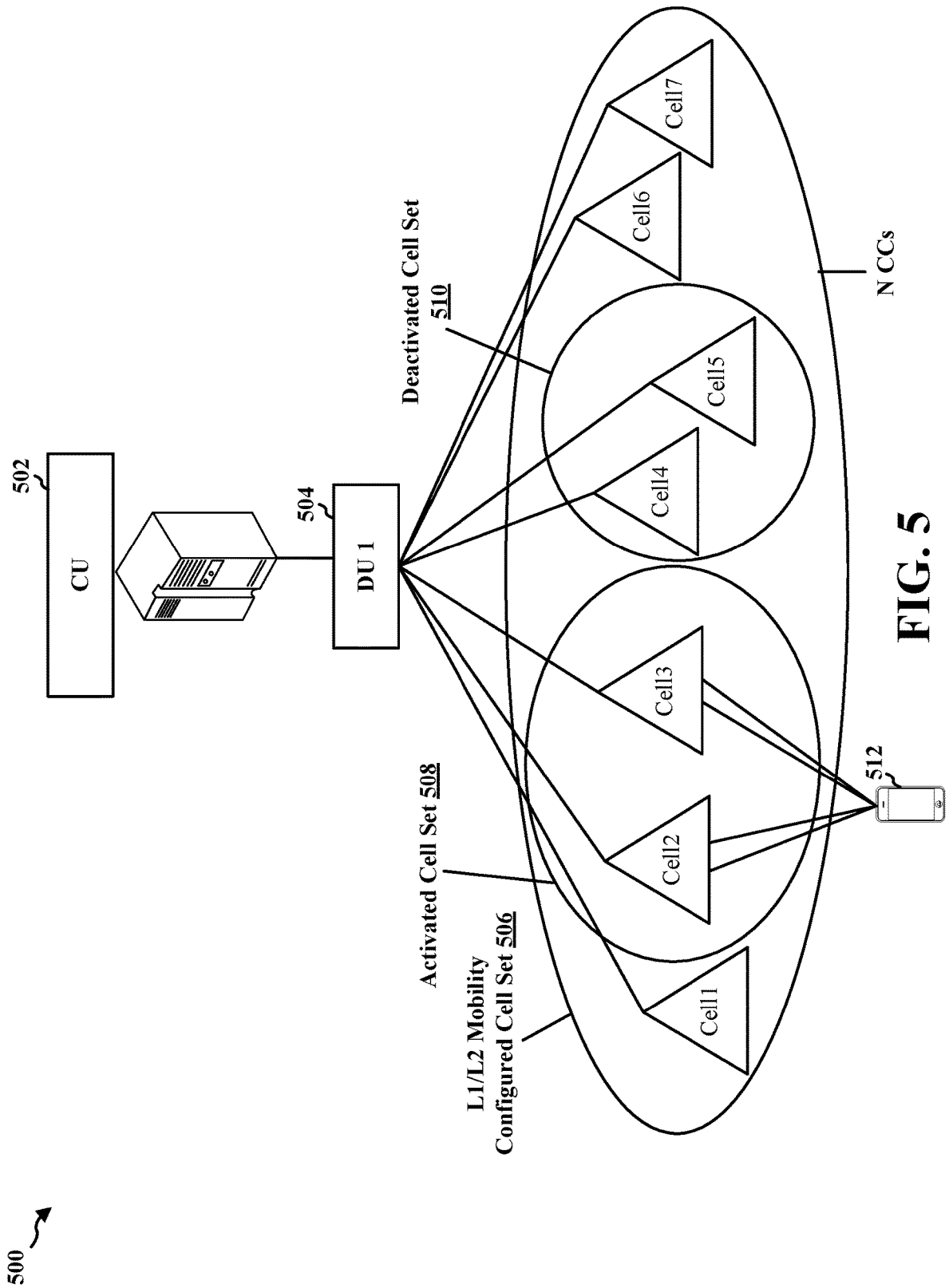
FIG. 5 is a diagram illustrating example cell configuration.

In some aspects, all cells in the L1/L2 mobility configured cell set may belong to a same DU and the cells may be on a same or different carrier frequencies. Cells in the L1/L2 mobility configured cell set may cover a mobility area. FIG. 5 is a diagram 500 illustrating example cell configuration. As illustrated in FIG. 5, a CU 502 (which may correspond to a component of a base station such as a gNB) may be associated with a first DU 504 (and other DUs). An L1/L2 mobility configured cell set 506 may be associated with the first DU 504 and may include a L1/L2 mobility activated cell set 508 and a L1/L2 mobility deactivated cell set 510. The L1/L2 mobility configured cell set 506 may also include one or more cells not in the current L1/L2 mobility activated cell set 508 or the current L1/L2 mobility deactivated cell set 510. For example, at a given time, the L1/L2 mobility activated cell set 508 may include a first subset of the L1/L2 mobility configured cell set, and the L1/L2 mobility deactivated cell set 510 may include a second, non-overlapping subset of the L1/L2 mobility configured cell set. There may remain one or more cells that are in the L1/L2 mobility configured cell set that are not in the first subset (e.g., activated) or the second subset (e.g., deactivated). A UE 512 may use the cells in the L1/L2 mobility activated cell set 508 for data channel and control channel communications.

A UE may be provided with a subset of L1/L2 mobility deactivated cells (candidate cell set) that the UE may autonomously choose to add to the L1/L2 mobility activated cell set. For example, the UE may add cells in the subset of L1/L2 mobility deactivated cells to the L1/L2 mobility activated cell set based on measurements (e.g., measured channel quality), loading, or the like. In some aspects, each of the RUs could have multi-component carrier (CC) (N CCs) support (where each CC is a cell). In some aspects, activation or deactivation may be performed for groups of carriers (cells). For PCell management, L1/L2 signaling may be used to set the PCell out of the configured options within the activated cell set. In some aspects, L3 mobility may be used for PCell change (L3 handover) when a new PCell is not from the activated cell set for L1/L2 mobility. As an example, RRC signaling may be used to update the set of cells for L1/L2 mobility at L3 handover. Example aspects may enable L1/L2 based inter-cell mobility that may co-exist with CA. Example aspects may provide configuration, cell activation or deactivation, and associated with signaling to enable L1/L2 mobility with CA to facilitate more efficient and robust mobility management. In some aspects, L1/L2 mobility configured cells may be associated with a PCell configuration without being the PCell. The PCell configuration may be activated and one of the L1/L2 mobility activated cells (e.g., in a L1/L2 mobility activated cell set) may be activated based on L1/L2 signaling to become a PCell. In some aspects, L1/L2 mobility deactivated cells (e.g., in a L1/L2 mobility deactivated cell set) may support L1 measurements to facilitate sufficient beam management, timing synchronization, power control, or the like. For L1/L2 mobility deactivated cells, measurement reporting may be done on an activated cell. In some aspects, a spCell may be PCell of master cell group (MCG) or primary secondary cell (PSCell) of secondary cell group (SCG). As used herein, the term "PCell" may refer to the PCell of the MCG or a primary secondary cell of SCG and may be used to refer to "spCell."

Figure 6:
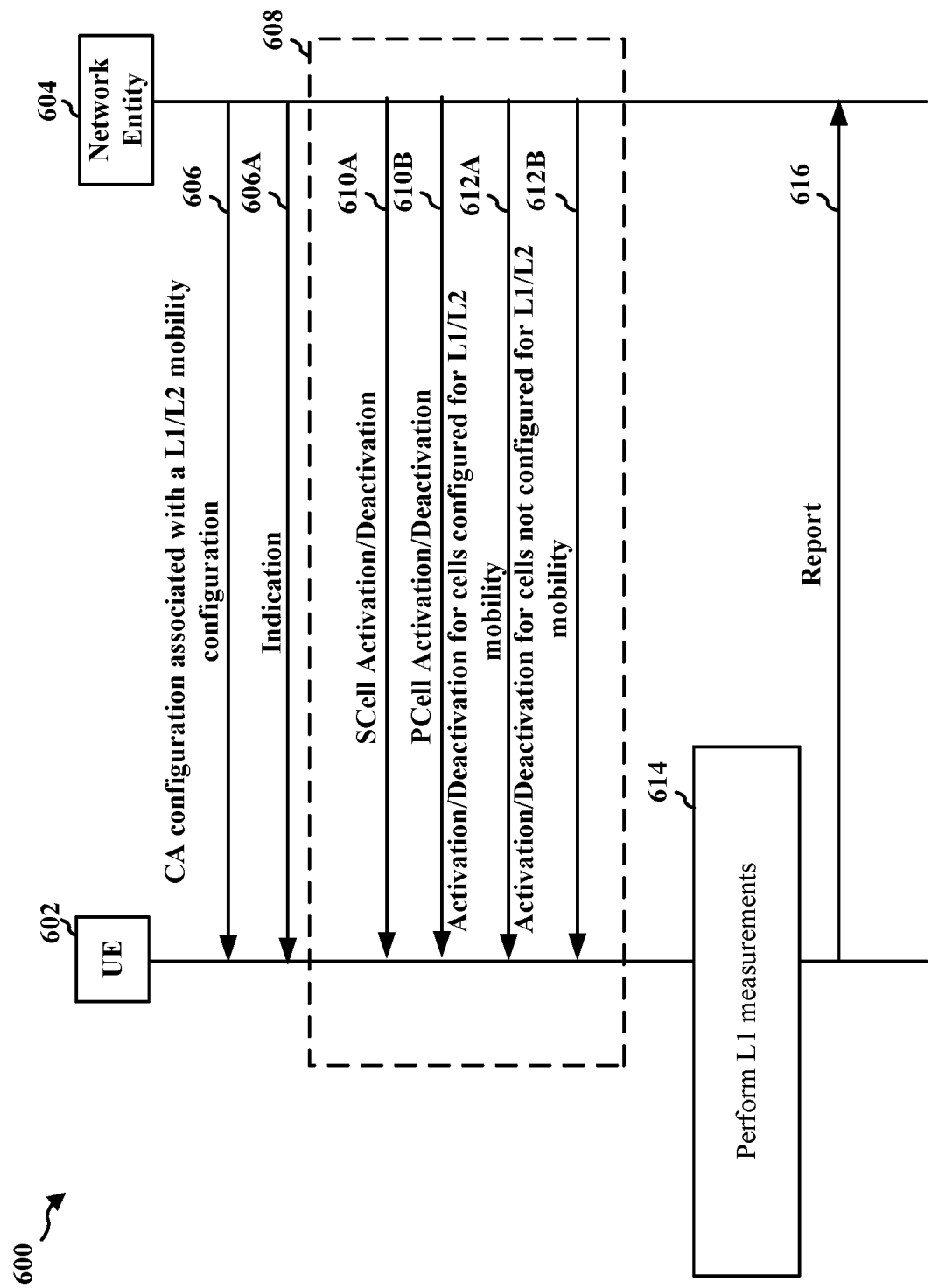
FIG. 6 is a diagram illustrating example communications between a network entity and a UE.

FIG. 6 is a diagram 600 illustrating example communications between a network entity 604 and a UE 602. In some aspects, the network entity 604 may be a network node. In some aspects, the network node may be implemented as an aggregated base station, a disaggregated base station, an integrated access and backhaul (IAB) node, a relay node, a sidelink node, or the like. In some aspects, the network entity 604 may be implemented in an aggregated or monolithic base station architecture, or alternatively, in a disaggregated base station architecture, and may include one or more of a CU, a DU, a RU, a Near-Real Time (Near-RT) RAN Intelligent Controller (RIC), or a Non-Real Time (Non-RT) RIC.

As illustrated in FIG. 6, the network entity 604 may transmit a CA configuration associated with a L1/L2 mobility configuration 606 to the UE 602. In some aspects, the CA configuration associated with a L1/L2 mobility configuration 606 may include the CA configuration and the L1/L2 mobility configuration. Such configuration may allow for L1/L2 mobility configuration at the same time CA is configured and upon CA configuration, e.g., at SCell addition or SCell modification. In some aspects, the CA configuration associated with a L1/L2 mobility configuration 606 may be transmitted for facilitating (and may be triggered based on) SCell addition or SCell modification. An example CA configuration associated with a L1/L2 mobility configuration 606 is provided below (one or more parameters or information elements (IEs) may be optional):

```
CellGroupConfig ::=         SEQUENCE {
    cellGroupId             CellGroupId,
    rlc-BearerToAddModList          SEQUENCE (SIZE(1..maxLC-ID)) OF RLC-BearerConfig
    rlc-BearerToReleaseList         SEQUENCE (SIZE(1..maxLC-ID)) OF
        LogicalChannelIdentity
    mac-CellGroupConfig             MAC-CellGroupConfig
    physicalCellGroupConfig         PhysicalCellGroupConfig
    spCellConfig            SpCellConfig
    sCellToAddModList               SEQUENCE (SIZE (1..maxNrofSCells)) OF
        SCellConfig
    sCellToReleaseList              SEQUENCE (SIZE (1..maxNrofSCells)) OF SCellIndex
    ...,
SCellConfig ::=         SEQUENCE {
    sCellIndex          SCellIndex,
    sCellConfigCommon           ServingCellConfigCommon
    SCellAdd
```

| sCellConfigDedicated | ServingCellConfig | SCellAddMod |
|---|---|---|
| ..., | | |
| ServingCellConfig ::= | SEQUENCE { | |
| ... | | |
| l1l2MobilityConfig | L1L2MobilityConfig | SCellAddMod |

The information element (IE) CellGroupId may identify a cell group. For example, CellGroupId being zero may identify master cell group and other values may identify corresponding secondary cell groups. The IE rlc-BearerToAdd-ModList may represent RLC entities of SRB(s) to be added. The RLC entities may be associated with different logical channel ID (LCID) or RLC bearer configurations. The IE rlc-BearerToReleaseList may represent RLC entities of SRB(s) to be released. The IE mac-CellGroupConfig may represent MAC parameters applicable to the entire cell group. The IE physicalCellGroupConfig may configure cell-group specific L1 parameters. The IE spCellConfig may represent Parameters for the special cell (spCell) of the cell group (PCell of master cell group (MCG) or primary secondary cell (PSCell) of secondary cell group (SCG)). The IE sCellToAddModList may represent a list of secondary serving cells (which may be SCells) to be added or modified. The IE sCellToReleaseList may represent a list of SCells to be released. The IE sCellIndex may be a short identity, used to identify an SCell. The value range may be shared across the Cell Groups. The IE sCellConfigCommon may represent common SCell configurations. The IE sCellConfigDedicated may represent dedicated SCell configurations for different SCells. The IE L1L2MobilityConfig may be included in the dedicated SCell configurations. The IE L1L2MobilityConfig may correspond with the L1/L2 mobility configuration and may include at least PCell configuration and L1 measurement configuration for deactivated state. In some aspects, the IE L1L2MobilityConfig may include the IE spCellConfig to apply when the cell is activated as PCell. In some aspects, the IE L1L2MobilityConfig may include more than one spCell configuration that may be provided for a single cell (e.g., represented by an IE spCell-ConfigList). The spCell configuration to be activated may be based on L1/L2 signaling, such as an indication 606A indicating which cell is the PCell among the L1/L2 mobility activated cells.

In some aspects, after the UE 602 receives the RRC configuration 606, the UE may transmit an uplink message to acknowledge reception of the RRC configuration 606. The uplink message may be representing RRC configuration/reconfiguration complete.

In some aspects, the network entity 604 may transmit an activation or deactivation 608 to the UE 602 to activate or deactivate a cell. In some aspects, the activation or deactivation 608 may be signaling for SCell activation/deactivation 610A or signaling for PCell activation/deactivation 610B. In some aspects, signaling for SCell activation/deactivation 610A and signaling for PCell activation/deactivation 610B may be separate. In some aspects, CA control (e.g., via MAC-CE) may be used for all configured cells (e.g., cells configured and not configured for L1/L2 mobility) and additional PCell activation/deactivation may be used for cells configured for L1/L2 mobility. In some aspects, SCell activation/deactivation 610A (via MAC-CE) may control the activation status (the serving cell availability for data and control Tx/Rx) for cells that are configured for L1/L2 mobility.

In some aspects, the PCell activation/deactivation 610B may be used for an activated SCell configured for L1/L2 mobility. In some aspects, the PCell activation/deactivation 610B may be a L1/L2 signaling that may activate a L1/L2 mobility activated cell to be a new PCell. The PCell activation/deactivation 610B may be transmitted via MAC-CE or DCI. In some aspects, PCell activation/deactivation 610B may activate the new PCell and may explicitly or implicitly deactivate previous PCell from the L1/L2 mobility cell set. In some aspects, the PCell activation/deactivation 610B may include separate explicit L1/L2 signaling for the activation and for the deactivation. In some aspects, the PCell activation/deactivation 610B may be based on a MAC-CE format with a LCID specific to L1/L2 mobility PCell activation or a DCI format. In some aspects, the MAC-CE format or the DCI format may include an explicit pointer to the cell ID associated with the L1/L2 mobility activated cell being activated as the new PCell or a bit in a bitmap (e.g., representing the cells) corresponding to the L1/L2 mobility activated cell being activated as the new PCell. In some aspects, the MAC-CE format or the DCI format may include an explicit pointer to the PCell configuration (spCellConfig) to activate if multiple configurations are available for the L1/L2 mobility activated cell being activated as the new PCell or a bit in the bitmap corresponding to one of the available PCell configurations (e.g., associated with the IE spCellConfigList).

In some aspects, if an SCell configured for L1/L2 mobility is deactivated, L1/L2 signaling may not directly activate the cell to be a new PCell, and the L1/L2 measurement (e.g., at 614), reporting (e.g., by transmitting report 616 to the network entity 604), and beam management on the deactivated cell may be done based on the L1/L2 mobility configuration. In some aspects, deactivated cell may be first activated then be designated as a PCell based on L1/L2 signaling (e.g., such as PCell activation/deactivation).

In some aspects, the activation or deactivation 608 may be indicated in signaling for activation/deactivation for cells configured for L1/L2 mobility 612A or signaling for activation/deactivation for cells not configured for L1/L2 mobility 612B. In some aspects, signaling for activation/deactivation for cells configured for L1/L2 mobility 612A and signaling for activation/deactivation for cells not configured for L1/L2 mobility 612B may be separate. For example, for the cells configured for L1/L2 mobility, a signaling (e.g., activation/deactivation for cells configured for L1/L2 mobility 612A) may be used to jointly control SCell activation/deactivation and PCell activation/deactivation. In some aspects, cells in L1/L2 mobility configured set are controlled by L1/L2 mobility signaling (e.g., activation/deactivation for cells configured for L1/L2 mobility 612A) that conveys cell activation/deactivation and PCell activation/deactivation. In some aspects, the L1/L2 mobility signaling (e.g., activation/deactivation for cells configured for L1/L2 mobility 612A) that conveys cell activation/deactivation and PCell activation/deactivation may be a single joint message. In some aspects, the single joint message may include SCell activation/deactivation and PCell activation/deactivation command, which may enable simultaneous cell activation and designation as a PCell and simultaneous deactivation and PCell re-designation of a cell. In some aspects, if there is no PCell change, the L1/L2 mobility signaling (e.g., activation/deactivation for cells configured for L1/L2 mobility 612A) may specify that there is no PCell change or may use a format (e.g., such as a MAC-CE format) associated with no PCell change (so that no explicit IE specifying there is no PCell change may be used).

In some aspects, the activation/deactivation for cells configured for L1/L2 mobility 612A may be based on a MAC-CE format with an LCID specific to L1/L2 mobility PCell activation or a DCI format. In some aspects, the MAC-CE format or the DCI format may include an explicit pointer to the cell ID associated with the L1/L2 mobility activated cell being activated as the new PCell or a bit in a bitmap (e.g., representing the cells) corresponding to the L1/L2 mobility activated cell being activated as the new PCell. In some aspects, the MAC-CE format or the DCI format may include an explicit pointer to the PCell configuration (spCellConfig) to activate if multiple configurations are available for the L1/L2 mobility activated cell being activated as the new PCell or a bit in the bitmap corresponding to one of the available PCell configurations (e.g., associated with the IE spCellConfigList). In some aspects, the activation/deactivation for cells not configured for L1/L2 mobility 612B may be a MAC-CE.

Figure 7:
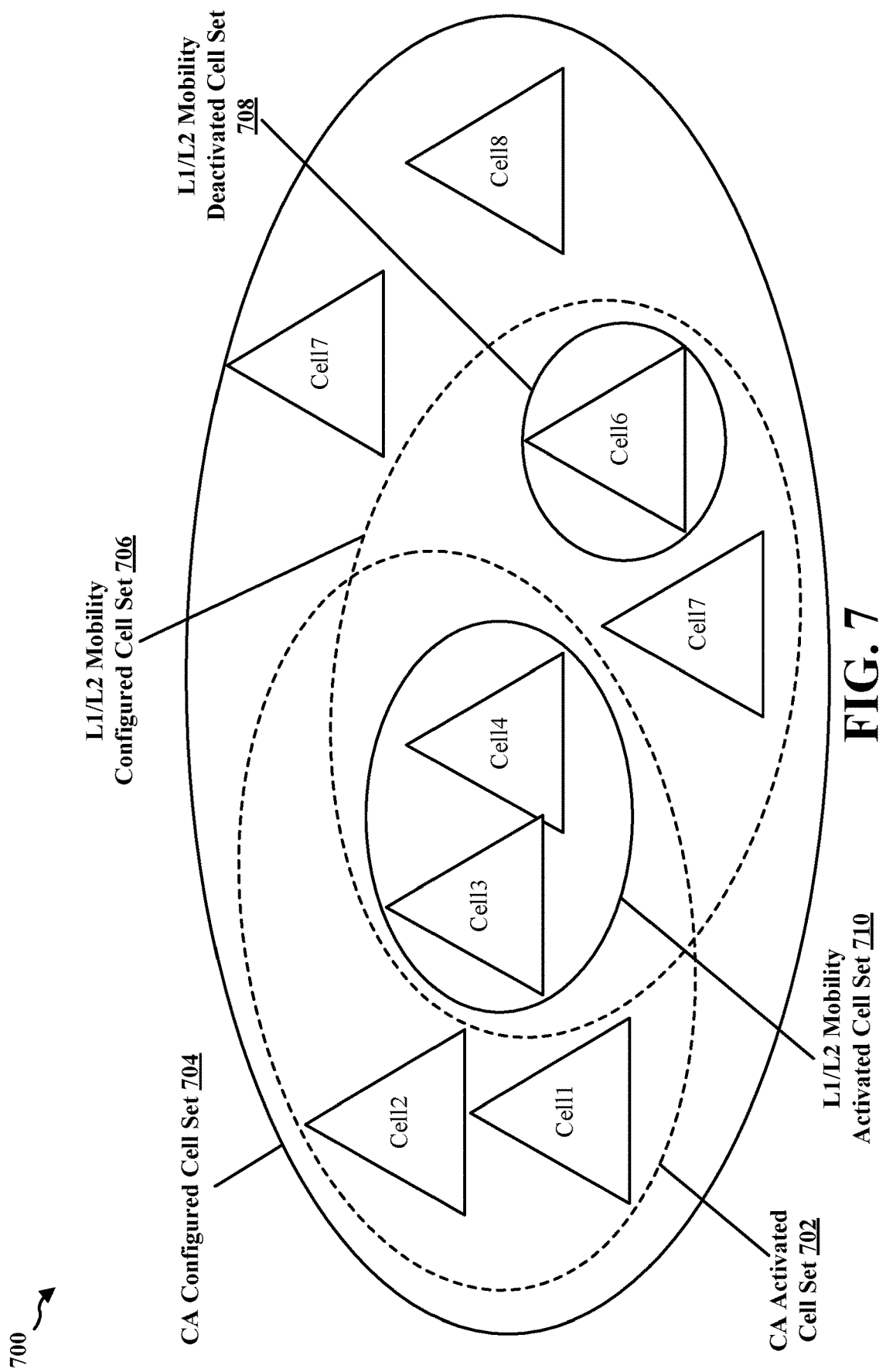
FIG. 7 is a diagram illustrating example cell configuration.

FIG. 7 is a diagram 700 illustrating an example cell set configuration. As illustrated in FIG. 7, in a CA configured cell set 704 (which may be indicated by the CA configuration in 606), there may be a CA activated cell set 702. The L1/L2 mobility activated cell set 710 (which may be indicated by the L1/L2 mobility configuration in 606) may be one or more activated sets and may be a subset of the CA activated cell set 702. The L1/L2 mobility configured cell set 706 may include the L1/L2 mobility activated cell set 710, the L1/L2 mobility deactivated cell set 708, and zero or more additional cells.

Figure 8:
FIG. 8 is a diagram illustrating an example medium access control (MAC) control element (MAC-CE).

FIG. 8 is a diagram 800 illustrating an example MAC-CE where SCell activation/deactivation and PCell activation/deactivation signaling are separate. As illustrated in FIG. 8, a cell ID field 802 may specify the SCell index that is being activated as the new spCell. For example, the cell ID field 802 may include 5 bits for a 32-cell configuration. Additional information field may specify other information regarding the newly activated spCell. A R1 field 804 may indicate whether there is an update. A spCell configuration ID field 806 may represent a spCell configuration (e.g., indicated by the spCell configuration ID) to use if the UE is configured with multiple spCell configurations. In some aspects, the spCell configuration ID field 806 may use a full Octet. In some aspects, a tracking reference signal (TRS) ID field 808 may represent TCI state(s) to activate for the activated spCell (e.g., and RS for beam refinement). In some aspects, if the new spCell is an already activated cell, the TRS ID field may not be included. In some aspects, if the new spCell is a previously deactivated cell and is being activated and updated as a new spCell with the MAC-CE, the TRS ID may be included in the TRS ID field 808. In some aspects, the MAC-CE may further include one or more L1 measurement/reporting configuration IDs 810A and 810N for the cells being deactivated. In some aspects, a reserved bit may indicate if the one or more L1 measurement/reporting configuration IDs 810A and 810N are included or not.

Figure 9:
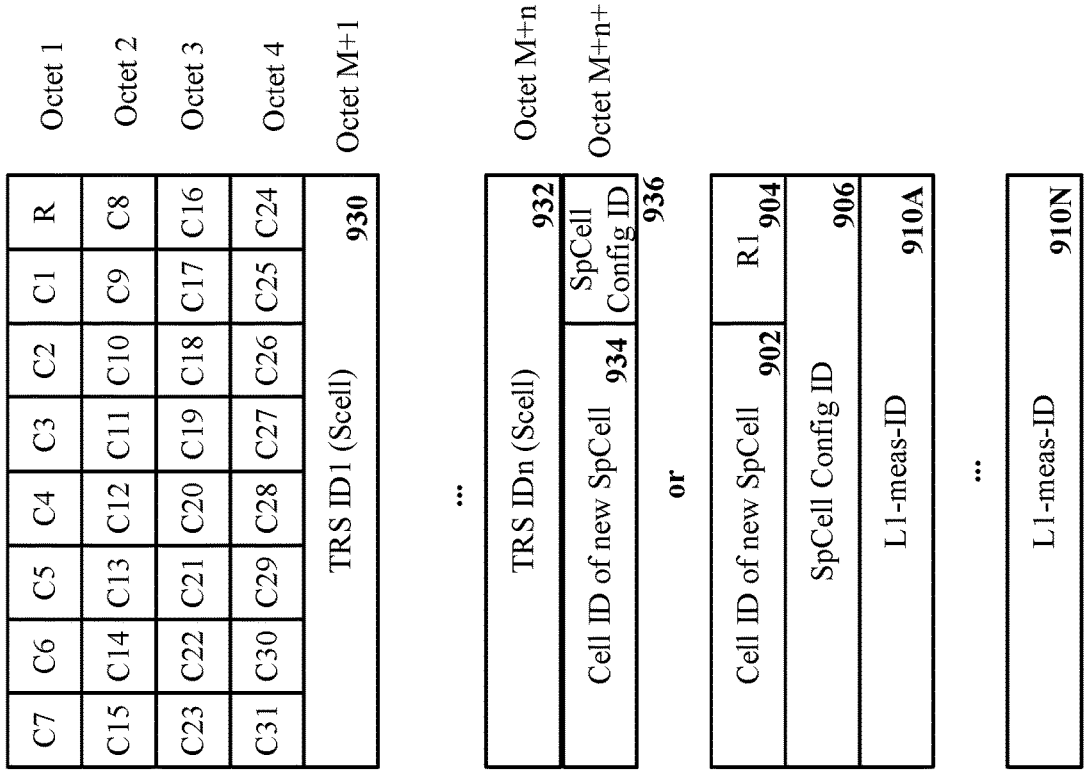
FIG. 9 is a diagram illustrating an example MAC-CE.

FIG. 9 is a diagram 900 illustrating an example MAC-CE where activation/deactivation signaling for cells configured for L1/L2 signaling and activation/deactivation signaling for cells not configured for L1/L2 mobility are separate. In some aspects, each of C1-C31 may be a binary bit where a value (e.g., 0) may refer to a deactivated cell index and another value (e.g., 1) may refer to an activated cell index. In some aspects, out of all the activated cells, one cell may be designated to be a new spCell. The number of octets designated to reference the cells configured for L1/L2 mobility may correspond to: the max number of cells that may be configured for L1/L2 mobility, overall number of configured cells, max number of cells that can be configured for a UE, or the like. In some aspects, for each activated cell (cell subset of size n) that was previously deactivated, there may be a corresponding 8-bit TRS ID field (e.g., TRS ID1 930 and TRS IDn 932) pointing to an associated RRC configuration (e.g., SCellActivationRS-Config). In some aspects, for the updated spCell, extra octet(s) of information may be attached. For example, cell ID of the newly designated spCell may be included in field 934. In some aspects, ID that points to a specific spCell RRC configuration (if multiple spCell configurations are configured for the UE) may be included in field 936. The field 934 and the field 936 may occupy a same Octet. Alternatively, the cell ID of the newly designated spCell may be included in field 902 and the ID that points to a specific spCell RRC configuration (if multiple spCell configurations are configured for the UE) may be included in field 906. The field 902 and the field 906 may occur different Octets, which may also include a reserved bit R1 904.

In some aspects, the reserved bit R1 904 may be used for indicating if the MAC-CE carries spCell update (e.g., value of R1 set to 1) or not (value of R1 set to 0). In some aspects, the R1 may imply if the Octet(s) referring to the spCell information may be present or not. In some aspects, if there is a spCell update, the current SpCell may be activated upon becoming an SCell (e.g., other bits may indicate its activation/deactivation). In some aspects, the reserved bit R1 904 may be used for indicating a new status (e.g., activated/deactivated) of the cell that is currently the spCell in case of the spCell update). For example, if R1 904 is set to 0, spCell update may be present. If R1 904 is set to 1, there may or may not be spCell update. An additional bit may be used for indicating the spCell update or a bit setting for the spCell update field may be used to indicate there is no spCell update. In some aspects, the MAC-CE may further include one or more L1 measurement/reporting configuration IDs 910A and 910N for the cells being deactivated.

Figure 10:
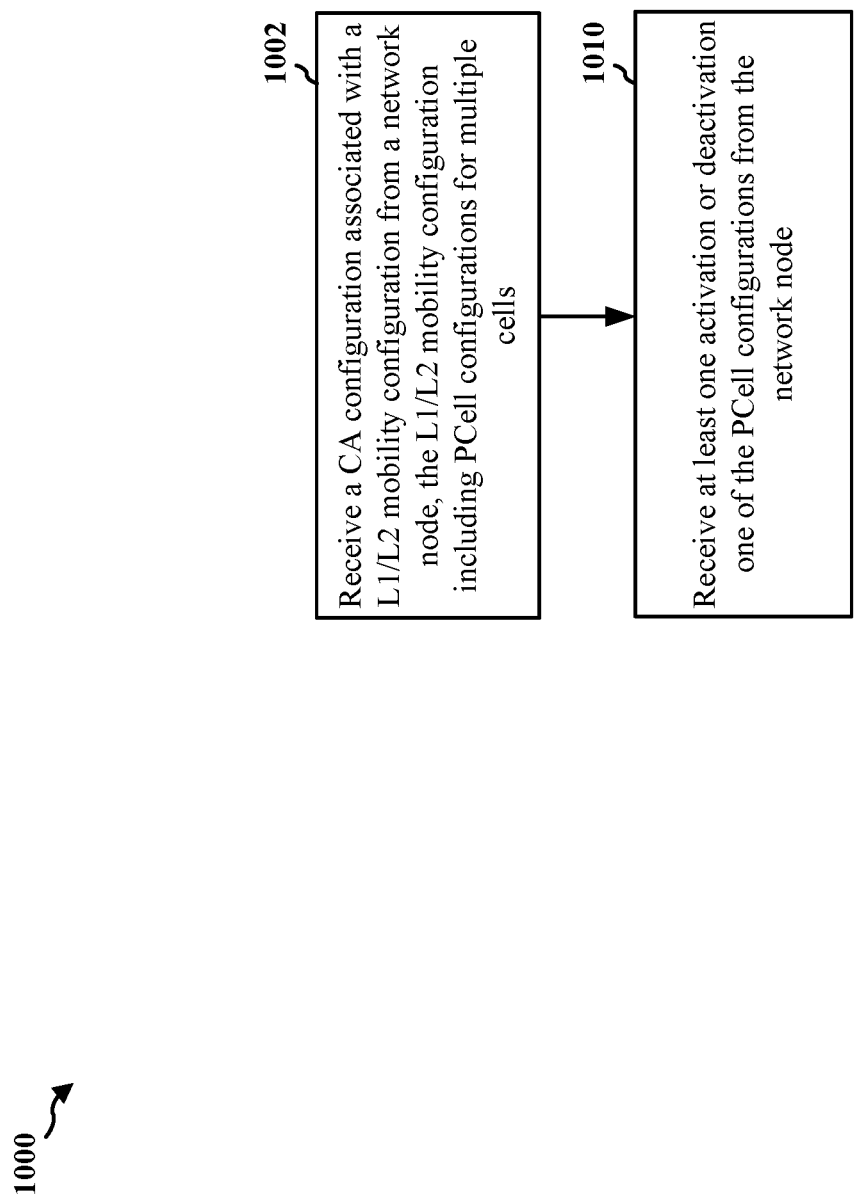
FIG. 10 is a flowchart of a method of wireless communication.

FIG. 10 is a flowchart 1000 of a method of wireless communication. The method may be performed by a UE (e.g., the UE 104, the UE 602; the apparatus 1404). The method may help to enable increased robustness against blocking and additional opportunities for higher rank for SDM across different cells while also providing for ongoing changes to cells considered in connection with L1/L2 mobility.

At 1002, the UE may receive a CA configuration associated with a L1/L2 mobility configuration from a network node, the L1/L2 mobility configuration including PCell configurations for multiple cells. For example, the UE 602 may receive a CA configuration associated with a L1/L2 mobility configuration 606 from a network node (e.g., network entity 604), the L1/L2 mobility configuration including PCell configurations for multiple cells. In some aspects, 1002 may be performed by the mobility component 198.

At 1010, the UE may receive at least one activation or deactivation 608 of one of the PCell configurations from the network node. For example, the UE 602 may receive at least one activation or deactivation of one of the PCell configurations from the network node. In some aspects, 1010 may be performed by the mobility component 198.

Figure 11:
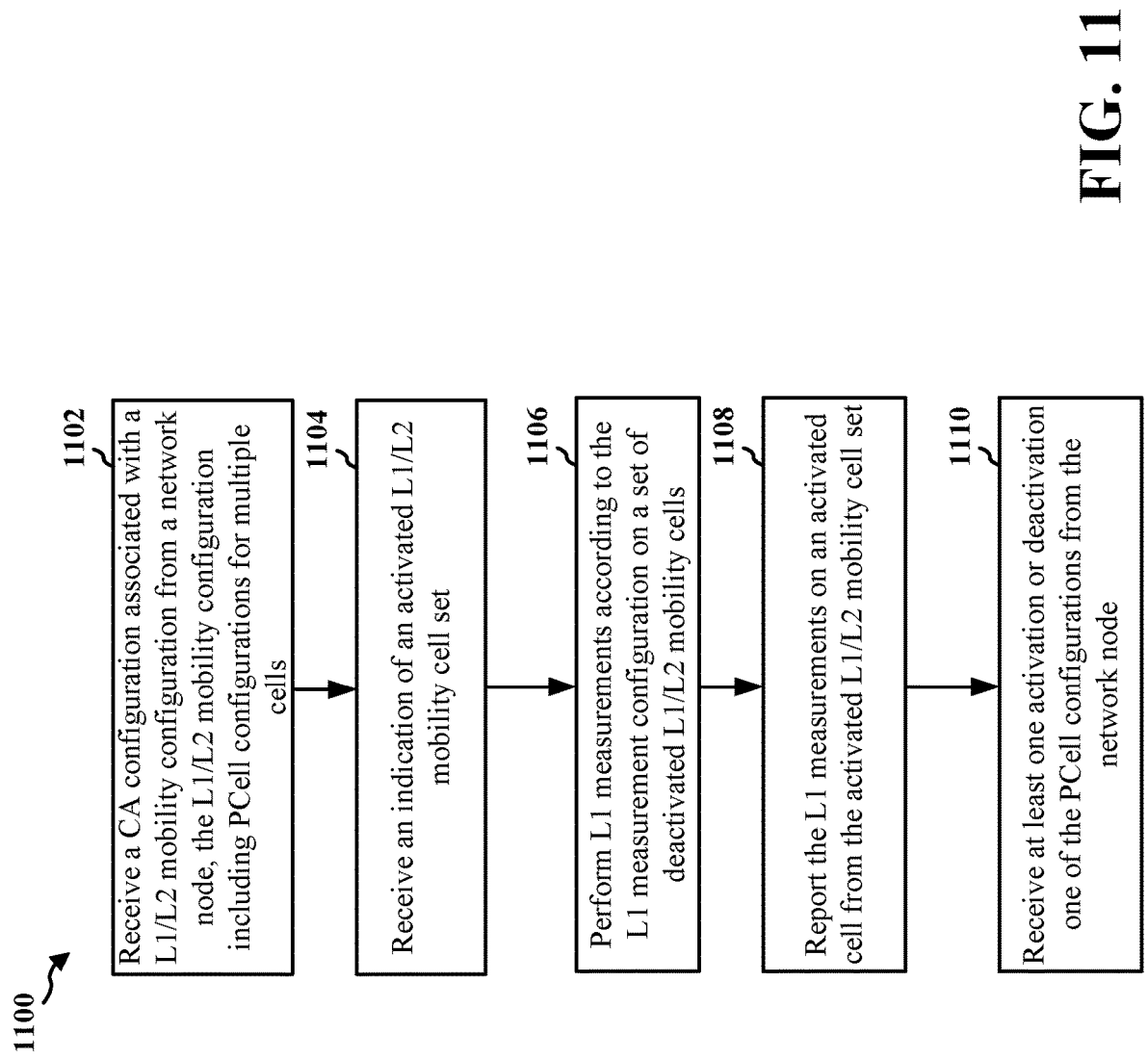
FIG. 11 is a flowchart of a method of wireless communication.

FIG. 11 is a flowchart 1100 of a method of wireless communication. The method may be performed by a UE (e.g., the UE 104, the UE 602; the apparatus 1404). The method may help to enable increased robustness against blocking and additional opportunities for higher rank for SDM across different cells while also providing for ongoing changes to cells considered in connection with L1/L2 mobility.

At 1102, the UE may receive a CA configuration associated with a L1/L2 mobility configuration from a network node, the L1/L2 mobility configuration including PCell configurations for multiple cells. For example, the UE 602 may receive a CA configuration associated with a L1/L2 mobility configuration 606 from a network node (e.g., network entity 604), the L1/L2 mobility configuration including PCell configurations for multiple cells. In some aspects, 1102 may be performed by the mobility component 198. In some aspects, the L1/L2 mobility configuration may further include at least one spCell configuration to be applied when a cell in the set of deactivated L1/L2 mobility cells is activated as a PCell. In some aspects, the at least one activation or deactivation indicates one spCell configuration of the at least one spCell configuration.

In some aspects, the L1/L2 mobility configuration may further include at least one of an L1 measurement configuration. At 1104, the UE may receive an indication of an activated L1/L2 mobility cell set. For example, the UE 602 may receive an indication of an activated L1/L2 mobility cell set. In some aspects, 1104 may be performed by the mobility component 198.

At 1106, the UE may perform L1 measurements according to the L1 measurement configuration on a set of deactivated L1/L2 mobility cells. For example, the UE 602 may perform L1 measurements according to the L1 measurement configuration on a set of deactivated L1/L2 mobility cells at 614. In some aspects, 1106 may be performed by the mobility component 198.

At 1108, the UE may report the L1 measurements on an activated cell from the activated L1/L2 mobility cell set. For example, the UE 602 may report the L1 measurements on an activated cell from the activated L1/L2 mobility cell set (e.g., report 616). In some aspects, 1108 may be performed by the mobility component 198.

At 1110, the UE may receive at least one activation or deactivation 608 of one of the PCell configurations from the network node. For example, the UE 602 may receive at least one activation or deactivation of one of the PCell configurations from the network node. In some aspects, 1110 may be performed by the mobility component 198.

In some aspects, the at least one activation or deactivation includes a SCell activation or deactivation (e.g., 610A) activating or deactivating an SCell for a data flow or a control flow or a PCell activation or deactivation (610B), the SCell activation or deactivation being separate from the PCell activation or deactivation. In some aspects, the PCell activation or deactivation activates an activated SCell in a L1/L2 mobility activated cell set to be a PCell. In some aspects, the PCell activation or deactivation deactivates a previous PCell. In some aspects, the PCell activation or deactivation is received via MAC-CE or DCI, where the MAC-CE or the DCI is associated with a LCID associated with L1/L2 PCell activation, and including: a first pointer to a cell ID associated with the activated SCell or a first bit corresponding with the activated SCell in a bitmap, a second pointer to a spCell configuration associated with the activated SCell or a second bit corresponding with the spCell configuration in the bitmap, or one or more TCI states to activate for the activated SCell. In some aspects, the MAC-CE may further include a TRS identifier associated with the one or more TCI states and a L1 measurement configuration identifier associated with the one or more cells being deactivated by the PCell activation or deactivation.

In some aspects, the at least one activation or deactivation includes at least one of: a first activation or deactivation (e.g., 612A) associated with an L1/L2 mobility activated cell set or an L1/L2 mobility deactivated cell set or a second activation or deactivation (e.g., 612B) associated with one or more cells not configured for L1/L2 mobility. In some aspects, the first activation or deactivation jointly controls SCell activation or deactivation and PCell activation and deactivation activating an activated SCell in the L1/L2 mobility activated cell set to be a PCell. In some aspects, the first activation or deactivation is received via MAC-CE associated with a LCID associated with L1/L2 PCell activation, and including: a pointer to a cell ID associated with the activated SCell or a bit corresponding with the activated SCell in a bitmap, a pointer to a spCell configuration associated with the activated SCell or a bit corresponding with the spCell configuration in the bitmap, or one or more TCI states to activate for the activated SCell. In some aspects, the L1/L2 mobility configuration configures at least one of a L1 measurement, a L1 measurement reporting, or a beam management associated with each cell in an L1/L2 mobility activated cell set and an L1/L2 mobility deactivated cell set. In some aspects, the L1 measurement reporting associated with each cell in the L1/L2 mobility deactivated cell set are based on an activated cell. In some aspects, the MAC-CE may further include an index representing a list of cells including the activated SCell, each entry of the index associated with one cell of the list of cells and represent whether the one cell is activated or deactivated. In some aspects, the MAC-CE may further include a TRS identifier associated with the one or more TCI states and a L1 measurement configuration identifier associated with the one or more cells being deactivated by the PCell activation or deactivation.

Figure 12:
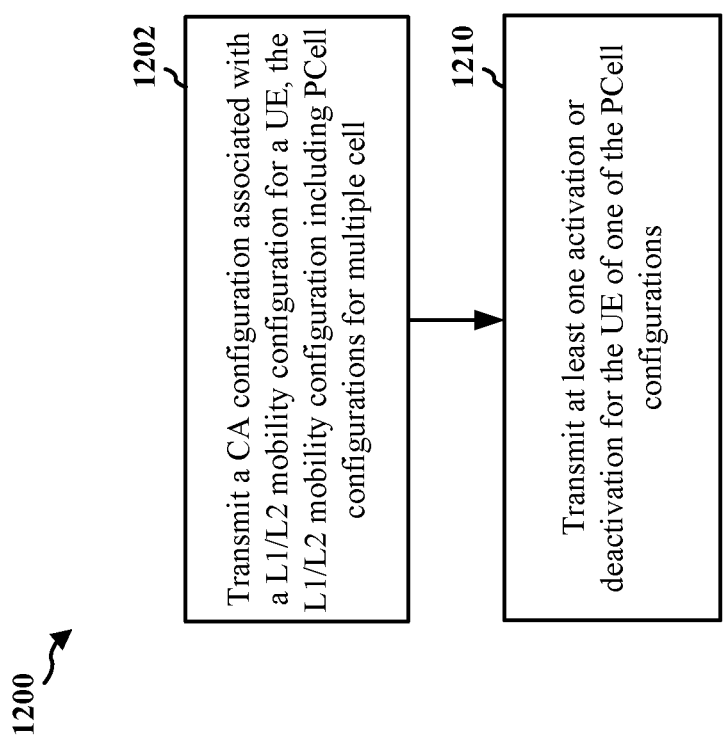
FIG. 12 is a flowchart of a method of wireless communication.

FIG. 12 is a flowchart 1200 of a method of wireless communication. The method may be performed by a network node (e.g., a base station or a component of a base station 102, 310; CU 110; DU 130; RU 140; the network entity 604, the network entity 604, 1402, the network entity 1502, the network entity 1660). The method may help to enable increased robustness against blocking and additional opportunities for higher rank for SDM across different cells while also providing for ongoing changes to cells considered in connection with L1/L2 mobility.

At 1202, the network node may transmit a CA configuration associated with a L1 or L2 mobility configuration for a UE, the L1 or L2 mobility configuration including PCell configurations for multiple cell. For example, the network entity 604 may transmit a CA configuration associated with a L1/L2 mobility configuration 606 for a UE 602, the L1/L2 mobility configuration including PCell configurations for multiple cell. In some aspects, 1202 may be performed by the mobility component 199.

At 1210, the network node may transmit at least one activation or deactivation for the UE of one of the PCell configurations. For example, the network entity 604 may transmit at least one activation or deactivation 608 for the UE 602 of one of the PCell configurations. In some aspects, 1210 may be performed by the mobility component 199.

Figure 13:
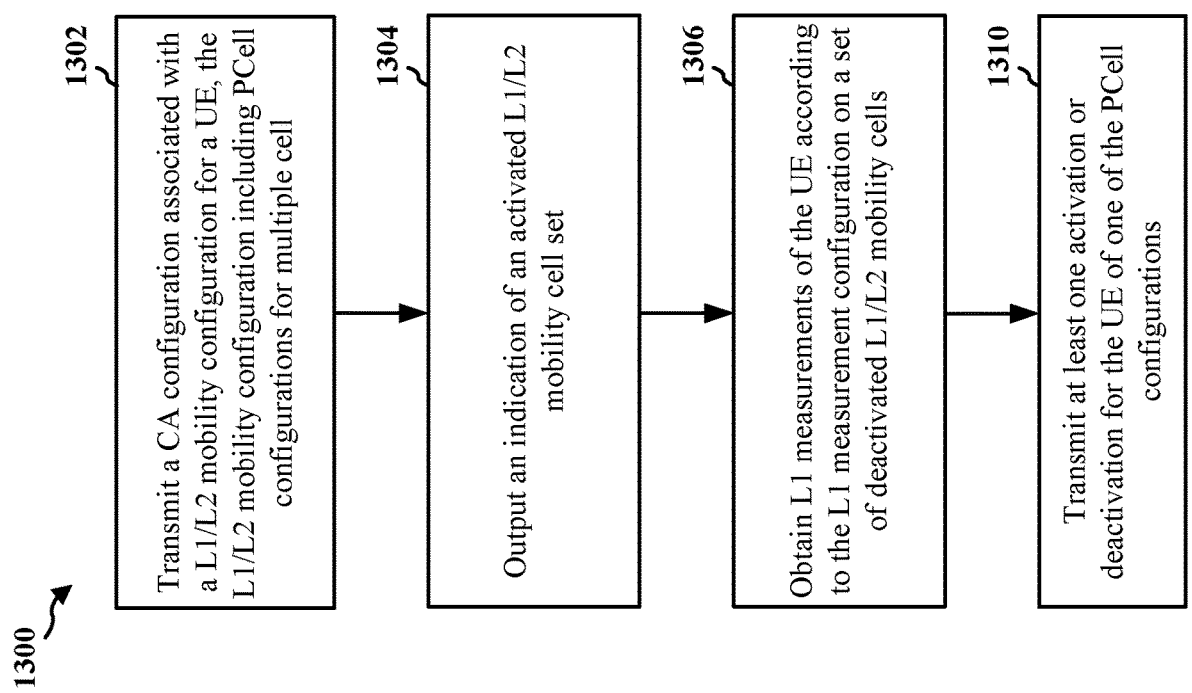
FIG. 13 is a flowchart of a method of wireless communication.

FIG. 13 is a flowchart 1300 of a method of wireless communication. The method may be performed by a network node (e.g., a base station or a component of a base station 102, 310; CU 110; DU 130; RU 140; the network entity 604, the network entity 604, 1402, the network entity 1502, the network entity 1660). The method may help to enable increased robustness against blocking and additional opportunities for higher rank for SDM across different cells while also providing for ongoing changes to cells considered in connection with L1/L2 mobility.

At 1302, the network node may transmit a CA configuration associated with a L1 or L2 mobility configuration for a UE, the L1 or L2 mobility configuration including PCell configurations for multiple cell. For example, the network entity 604 may transmit a CA configuration associated with a L1/L2 mobility configuration 606 for a UE 602, the L1/L2 mobility configuration including PCell configurations for multiple cell. In some aspects, 1302 may be performed by the mobility component 199. In some aspects, the L1/L2 mobility configuration may further include at least one spCell configuration to be applied when a cell in the set of deactivated L1/L2 mobility cells is activated as a PCell. In some aspects, the at least one activation or deactivation indicates one spCell configuration of the at least one spCell configuration.

In some aspects, the L1 or L2 mobility configuration may further include at least one of an L1 measurement configuration. At 1304, the network node may output an indication of an activated L1/L2 mobility cell set. For example, the network entity 604 may output an indication of an activated L1/L2 mobility cell set. In some aspects, 1304 may be performed by the mobility component 199.

At 1306, the network node may obtain L1 measurements of the UE according to the L1 measurement configuration on a set of deactivated L1 or L2 mobility cells. For example, the network entity 604 may obtain L1 measurements of the UE according to the L1 measurement configuration on a set of deactivated L1/L2 mobility cells (e.g., based on report 616). In some aspects, 1306 may be performed by the mobility component 199.

At 1310, the network node may transmit at least one activation or deactivation for the UE of one of the PCell configurations. For example, the network entity 604 may transmit at least one activation or deactivation 608 for the UE 602 of one of the PCell configurations. In some aspects, 1310 may be performed by the mobility component 199.

In some aspects, the at least one activation or deactivation includes a SCell activation or deactivation (e.g., 610A) activating or deactivating an SCell for a data flow or a control flow or a PCell activation or deactivation (610B), the SCell activation or deactivation being separate from the PCell activation or deactivation. In some aspects, the PCell activation or deactivation activates an activated SCell in a L1 or L2 mobility activated cell set to be a PCell. In some aspects, the PCell activation or deactivation deactivates a previous PCell. In some aspects, the PCell activation or deactivation is transmitted via MAC-CE or DCI, where the MAC-CE or the DCI is associated with a LCID associated with L1 or L2 PCell activation, and including: a first pointer to a cell ID associated with the activated SCell or a first bit corresponding with the activated SCell in a bitmap, a second pointer to a spCell configuration associated with the activated SCell or a second bit corresponding with the spCell configuration in the bitmap, or one or more TCI states to activate for the activated SCell. In some aspects, the MAC-CE may further include a TRS identifier associated with the one or more TCI states and a L1 measurement configuration identifier associated with the one or more cells being deactivated by the PCell activation or deactivation.

In some aspects, the at least one activation or deactivation includes at least one of: a first activation or deactivation (e.g., 612A) associated with an L1 or L2 mobility activated cell set or an L1 or L2 mobility deactivated cell set or a second activation (e.g., 612B) or deactivation associated with one or more cells not configured for L1/L2 mobility. In some aspects, the first activation or deactivation jointly controls SCell activation or deactivation and PCell activation and deactivation activating an activated SCell in the L1 or L2 mobility activated cell set to be a PCell. In some aspects, the first activation or deactivation is transmitted via MAC-CE associated with a LCID associated with L1 or L2 PCell activation, and including: a pointer to a cell ID associated with the activated SCell or a bit corresponding with the activated SCell in a bitmap, a pointer to a spCell configuration associated with the activated SCell or a bit corresponding with the spCell configuration in the bitmap, or one or more TCI states to activate for the activated SCell. In some aspects, the L1 or L2 mobility configuration configures at least one of a L1 measurement, a L1 measurement reporting, or a beam management associated with each cell in an L1 or L2 mobility activated cell set and an L1 or L2 mobility deactivated cell set. In some aspects, the L1 measurement reporting associated with each cell in the L1 or L2 mobility deactivated cell set are based on an activated cell. In some aspects, the MAC-CE may further include an index representing a list of cells including the activated SCell, each entry of the index associated with one cell of the list of cells and represent whether the one cell is activated or deactivated. In some aspects, the MAC-CE may further include a TRS identifier associated with the one or more TCI states and a L1 measurement configuration identifier associated with the one or more cells being deactivated by the PCell activation or deactivation.

Figure 14:
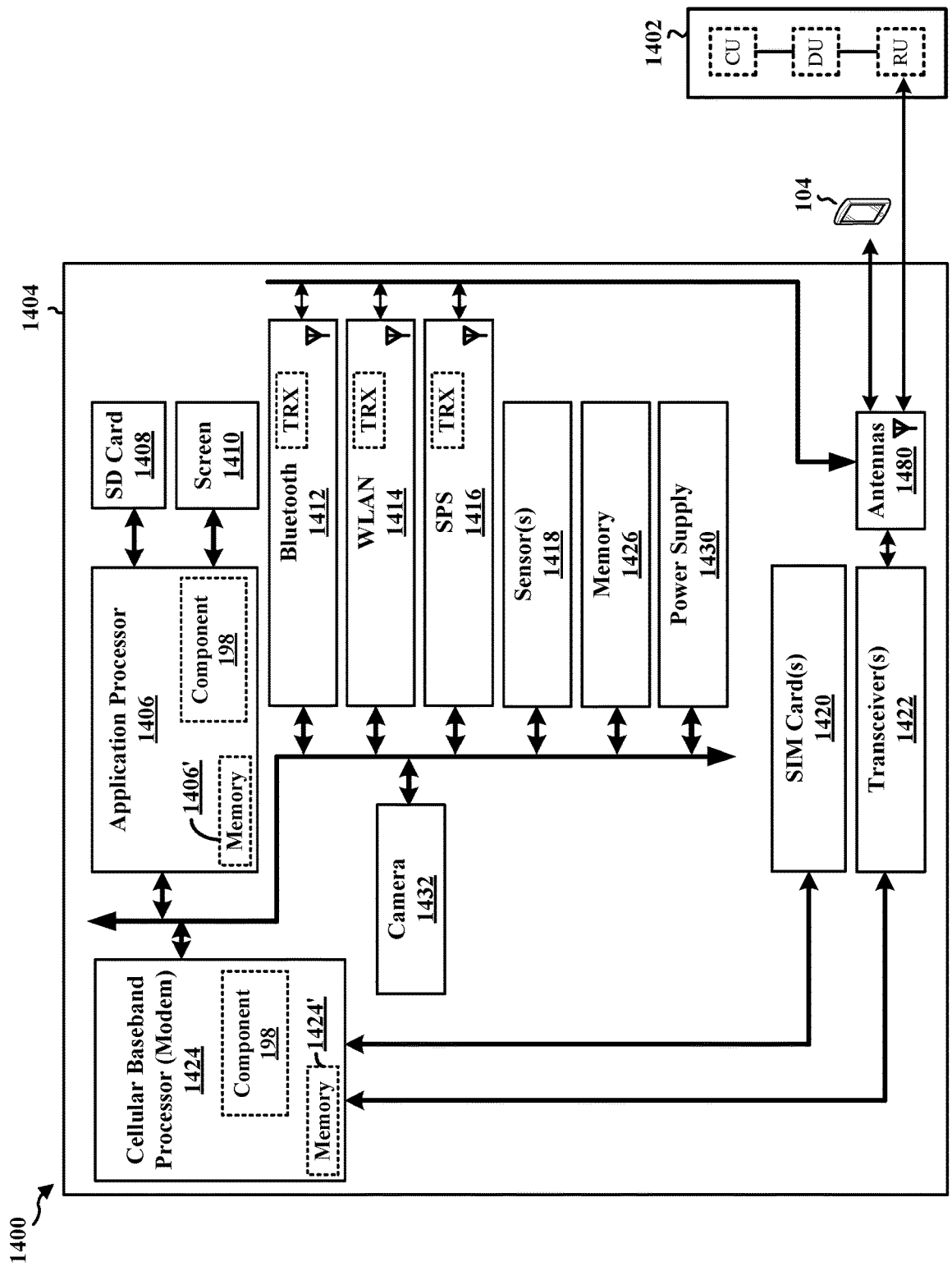
FIG. 14 is a diagram illustrating an example of a hardware implementation for an example apparatus and/or UE.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include a cellular baseband processor 1424 (also referred to as a modem) coupled to one or more transceivers 1422 (e.g., cellular RF transceiver). The cellular baseband processor 1424 may include on-chip memory 1424'. In some aspects, the apparatus 1404 may further include one or more subscriber identity modules (SIM) cards 1420 and an application processor 1406 coupled to a secure digital (SD) card 1408 and a screen 1410. The application processor 1406 may include on-chip memory 1406'. In some aspects, the apparatus 1404 may further include a Bluetooth module 1412, a WLAN module 1414, a satellite system module 1416 (e.g., GNSS module), one or more sensor modules 1418 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the satellite system module 1416 may include an on-chip transceiver (TRX)/receiver (RX). The cellular baseband processor 1424 communicates through the transceiver(s) 1422 via one or more antennas 1480 with the UE 104 and/or with an RU associated with a network entity

1402. The cellular baseband processor 1424 and the application processor 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor 1424 and the application processor 1406 are each responsible for general processing, including the execution of software stored on the computer-readable medium/memory. The software, when executed by the cellular baseband processor 1424/application processor 1406, causes the cellular baseband processor 1424/application processor 1406 to perform the various functions described supra. The computer-readable medium/memory may also be used for storing data that is manipulated by the cellular baseband processor 1424/application processor 1406 when executing software. The cellular baseband processor 1424/application processor 1406 may be a component of the UE 350 and may include the memory 360 and/or at least one of the TX processor 368, the RX processor 356, and the controller/processor 359. In one configuration, the apparatus 1404 may be a processor chip (modem and/or application) and include just the cellular baseband processor 1424 and/or the application processor 1406, and in another configuration, the apparatus 1404 may be the entire UE (e.g., see 350 of FIG. 3) and include the additional modules of the apparatus 1404.

As discussed supra, the mobility component 198 may be configured to receive a carrier aggregation (CA) configuration associated with a layer 1 (L1) or layer 2 (L2) mobility configuration from a network node, the L1/L2 mobility configuration including primary cell (PCell) configurations for multiple cells. In some aspects, the mobility component 198 may be further configured to receive at least one activation or deactivation of one of the PCell configurations from the network node. The mobility component 198 may be further configured to perform any of the aspects described in connection with the flowcharts in FIG. 10, or FIG. 11, and/or any of the aspects performed by the UE 602 in FIG. 6. The mobility component 198 may be within the cellular baseband processor 1424, the application processor 1406, or both the cellular baseband processor 1424 and the application processor 1406. The mobility component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1404 may include a variety of components configured for various functions. In one configuration, the apparatus 1404, and in particular the cellular baseband processor 1424 and/or the application processor 1406, includes means for receiving a CA configuration associated with a L1 or L2 mobility configuration from a network node, the L1 or L2 mobility configuration including PCell configurations for multiple cells. In some aspects, the apparatus 1404 may further include means for receiving at least one activation or deactivation of one of the PCell configurations from the network node. In some aspects, the apparatus 1404 may further include means for receiving an indication of an activated L1 or L2 mobility cell set. In some aspects, the apparatus 1404 may further include means for performing L1 measurements according to the L1 measurement configuration on a set of deactivated L1 or L2 mobility cells. In some aspects, the apparatus 1404 may further include means for reporting the L1 measurements on an activated cell from the activated L1 or L2 mobility cell set. The means may be the mobility component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

Figure 15:
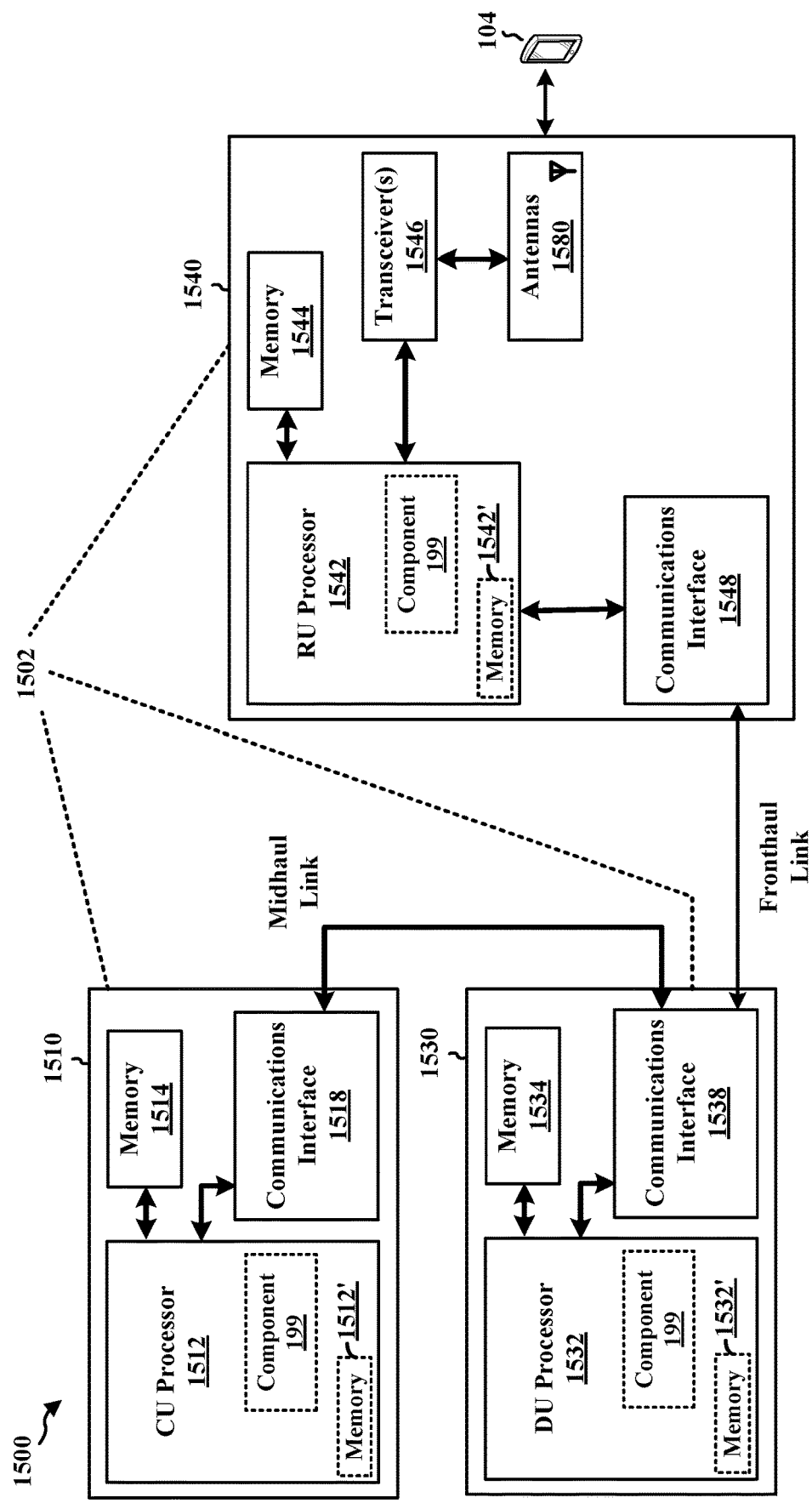
FIG. 15 is a diagram illustrating an example of a hardware implementation for an example network entity.

FIG. 15 is a diagram 1500 illustrating an example of a hardware implementation for a network entity 1502 or network node. The network entity 1502 may be a BS, a component of a BS, or may implement BS functionality. The network entity 1502 may include at least one of a CU 1510, a DU 1530, or an RU 1540. For example, depending on the layer functionality handled by the component 199, the network entity 1502 may include the CU 1510; both the CU 1510 and the DU 1530; each of the CU 1510, the DU 1530, and the RU 1540; the DU 1530; both the DU 1530 and the RU 1540; or the RU 1540. The CU 1510 may include a CU processor 1512. The CU processor 1512 may include on-chip memory 1512'. In some aspects, the CU 1510 may further include additional memory modules 1514 and a communications interface 1518. The CU 1510 communicates with the DU 1530 through a midhaul link, such as an F1 interface. The DU 1530 may include a DU processor 1532. The DU processor 1532 may include on-chip memory 1532'. In some aspects, the DU 1530 may further include additional memory modules 1534 and a communications interface 1538. The DU 1530 communicates with the RU 1540 through a fronthaul link. The RU 1540 may include an RU processor 1542. The RU processor 1542 may include on-chip memory 1542'. In some aspects, the RU 1540 may further include additional memory modules 1544, one or more transceivers 1546, antennas 1580, and a communications interface 1548. The RU 1540 communicates with the UE 104. The on-chip memory 1512', 1532', 1542' and the additional memory modules 1514, 1534, 1544 may each be considered a computer-readable medium/memory. Each computer-readable medium/memory may be non-transitory. Each of the processors 1512, 1532, 1542 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the mobility component 199 may be configured to transmit a CA configuration associated with a L1/L2 mobility configuration for a UE, the L1/L2 mobility configuration including PCell configurations for multiple cell. In some aspects, the mobility component 199 may be further configured to transmit at least one activation or deactivation for the UE of one of the PCell configurations. The mobility component 198 may be further configured to perform any of the aspects described in connection with the flowcharts in FIG. 12, or FIG. 13, and/or any of the aspects performed by the network entity 604 in FIG. 6. The mobility component 199 may be within one or more processors of one or more of the CU 1510, DU 1530, and the RU 1540. The mobility component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1502 may include a variety of components configured for various functions. In one configuration, the network entity 1502 includes means for transmitting a CA configuration associated with a L1/L2 mobility configuration for a UE, the L1/L2 mobility configuration including PCell configurations for multiple cell. In some aspects, the network entity 1502 may further include means for transmitting at least one activation or deactivation for the UE of one of the PCell configurations. In some aspects, the network entity 1502 may further include means for outputting an indication of an activated L1/L2 mobility cell set. In some aspects, the network entity 1502 may further include means for obtaining L1 measurements of the UE according to the L1 measurement configuration on a set of deactivated L1/L2 mobility cells. The means may be the mobility component 199 of the network entity 1502 configured to perform the functions recited by the means. As described supra, the network entity 1502 may include the TX processor 316, the RX processor 370, and the controller/processor 375. As such, in one configuration, the means may be the TX processor 316, the RX processor 370, and/or the controller/processor 375 configured to perform the functions recited by the means.

Figure 16:
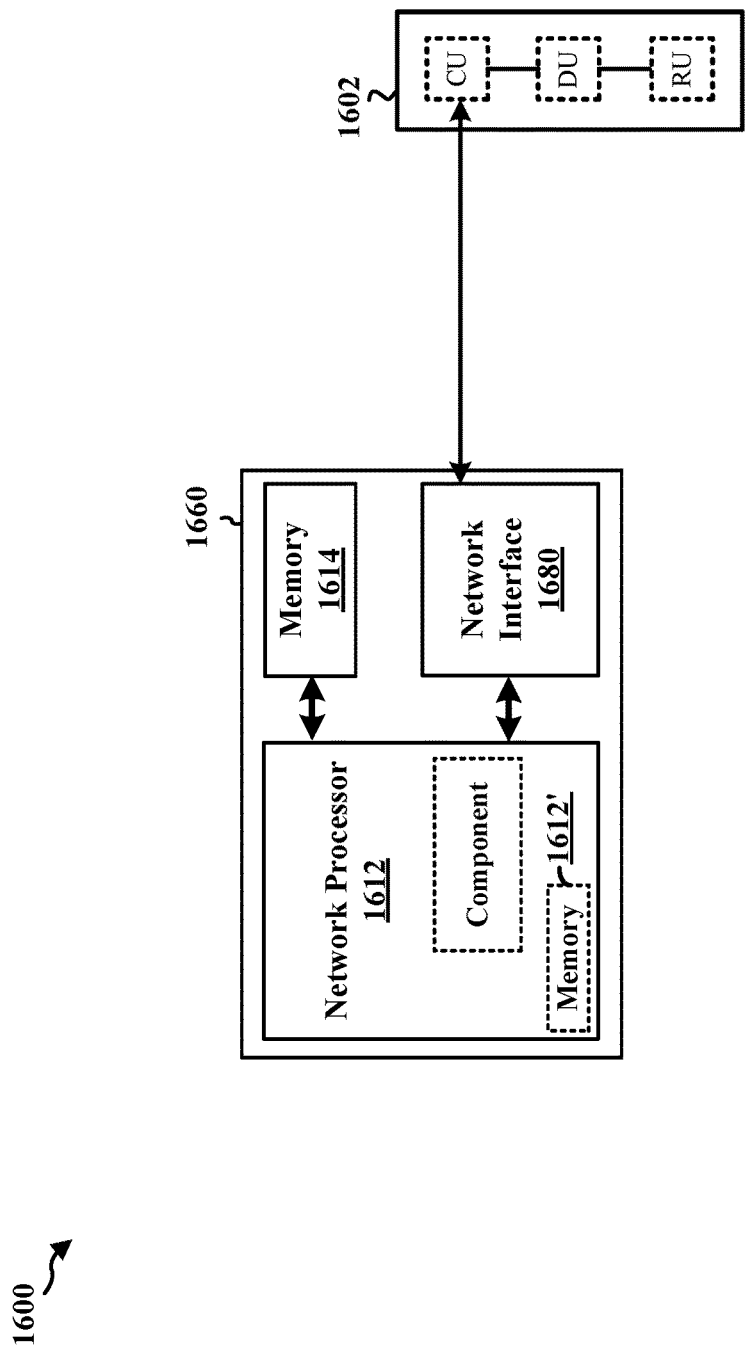
FIG. 16 is a diagram illustrating an example of a hardware implementation for an example network entity.

FIG. 16 is a diagram 1600 illustrating an example of a hardware implementation for a network entity 1660. In one example, the network entity 1660 may be within the core network 140. The network entity 1660 may include a network processor 1612. The network processor 1612 may include on-chip memory 1612'. In some aspects, the network entity 1660 may further include additional memory modules 1614. The network entity 1660 communicates via the network interface 1680 directly (e.g., backhaul link) or indirectly (e.g., through a RIC) with the CU 1602. The on-chip memory 1612' and the additional memory modules 1614 may each be considered a computer-readable medium/memory. Each computer-readable medium/memory may be non-transitory. The processor 1612 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the mobility component 199 may be configured to transmit a CA configuration associated with a L1/L2 mobility configuration for a UE, the L1/L2 mobility configuration including PCell configurations for multiple cell. In some aspects, the mobility component 199 may be further configured to transmit at least one activation or deactivation for the UE of one of the PCell configurations. The mobility component 199 may be within the processor 1612. The mobility component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1660 may include a variety of components configured for various functions. In one configuration, the network entity 1660 includes means for transmitting a CA configuration associated with a L1/L2 mobility configuration for a UE, the L1/L2 mobility configuration including PCell configurations for multiple cell. In some aspects, the network entity 1660 may further include means for transmitting at least one activation or deactivation for the UE of one of the PCell configurations. In some aspects, the network entity 1660 may further include means for outputting an indication of an activated L1/L2 mobility cell set. In some aspects, the network entity 1660 may further include means for obtaining L1 measurements of the UE according to the L1 measurement configuration on a set of deactivated L1/L2 mobility cells. The means may be the component 199 of the network entity 1660 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used in this disclosure outside of the claims, the phrase "based on" is inclusive of all interpretations and shall not be limited to any single interpretation unless specifically recited or indicated as such. For example, the phrase "based on A" (where "A" may be information, a condition, a factor, or the like) may be interpreted as: "based at least on A," "based in part on A," "based at least in part on A," "based only on A," or "based solely on A." Accordingly, as disclosed herein, "based on A" may, in one aspect, refer to "based at least on A." In another aspect, "based on A" may refer to "based in part on A." In another aspect, "based on A" may refer to "based at least in part on A." In another aspect, "based on A" may refer to "based only on A." In another aspect, "based on A" may refer to "based solely on A." In another aspect, "based on A" may refer to any combination of interpretations in the alternative. As used in the claims, the phrase "based on A" shall be interpreted as "based at least on A" unless specifically recited differently.

The following aspects are illustrative only and may be combined with other aspects or teachings described herein, without limitation.

Aspect 1 is an apparatus for communication at a user equipment (UE), including: a memory; and at least one processor coupled to the memory and, based at least in part on information stored in the memory, the at least one processor is configured to: receive a carrier aggregation (CA) configuration associated with a layer 1 (L1) or layer 2 (L2) mobility configuration from a network node, the L1 or L2 mobility configuration including primary cell (PCell) configurations for multiple cells; and receive at least one activation or deactivation of one of the PCell configurations from the network node.

Aspect 2 is the apparatus of aspect 1, where the L1/L2 mobility configuration further includes at least one of an L1 measurement configuration, where the at least one processor is further configured to: receive an indication of an activated L1 or L2 mobility cell set; perform L1 measurements according to the L1 measurement configuration on a set of deactivated L1 or L2 mobility cells; and report the L1 measurements on an activated cell from the activated L1 or L2 mobility cell set.

Aspect 3 is the apparatus of any of aspects 1-2, where the L1 or L2 mobility configuration further includes at least one special cell (spCell) configuration to be applied when a cell in the set of deactivated L1 or L2 mobility cells is activated as a PCell.

Aspect 4 is the apparatus of any of aspects 1-3, where the at least one activation or deactivation indicates one spCell configuration of the at least one spCell configuration.

Aspect 5 is the apparatus of any of aspects 1-4, where the at least one activation or deactivation includes: a secondary cell (SCell) activation or deactivation activating or deactivating an SCell for a data flow or a control flow, or a PCell activation or deactivation, the SCell activation or deactivation being separate from the PCell activation or deactivation.

Aspect 6 is the apparatus of any of aspects 1-5, where the PCell activation or deactivation activates an activated SCell in a L1 or L2 mobility activated cell set to be a PCell.

Aspect 7 is the apparatus of any of aspects 1-6, where the PCell activation or deactivation deactivates a previous PCell.

Aspect 8 is the apparatus of any of aspects 1-7, where the PCell activation or deactivation is received via medium access control (MAC) control element (MAC-CE) or downlink control information (DCI), where the MAC-CE or the DCI is associated with a logical channel identifier (LCID) associated with L1 or L2 PCell activation, and including: a first pointer to a cell ID associated with the activated SCell or a first bit corresponding with the activated SCell in a bitmap, a second pointer to a special cell (spCell) configuration associated with the activated SCell or a second bit corresponding with the spCell configuration in the bitmap, or one or more transmission configuration indicator (TCI) states to activate for the activated SCell.

Aspect 9 is the apparatus of any of aspects 1-4, where the at least one activation or deactivation includes at least one of: a first activation or deactivation associated with an L1 or L2 mobility activated cell set or an L1 or L2 mobility deactivated cell set, or a second activation or deactivation associated with one or more cells not configured for L1 or L2 mobility.

Aspect 10 is the apparatus of any of aspects 1-4 and 9, where the first activation or deactivation jointly controls SCell activation or deactivation activating or deactivating an SCell for a data flow or a control flow and PCell activation and deactivation activating an activated SCell in the L1 or L2 mobility activated cell set to be a PCell.

Aspect 11 is the apparatus of any of aspects 1-4 and 9-10, where the first activation or deactivation is received via medium access control (MAC) control element (MAC-CE) associated with a logical channel identifier (LCID) associated with L1 or L2 PCell activation, and including: a first pointer to a cell ID associated with the activated SCell or a first bit corresponding with the activated SCell in a bitmap, a second pointer to a special cell (spCell) configuration associated with the activated SCell or a second bit corresponding with the spCell configuration in the bitmap, or one or more transmission configuration indicator (TCI) states to activate for the activated SCell.

Aspect 12 is the apparatus of any of aspects 1-4 and 9-11, where the L1 or L2 mobility configuration configures at least one of a L1 measurement, a L1 measurement reporting, or a beam management associated with each cell in an L1 or L2 mobility activated cell set and an L1 or L2 mobility deactivated cell set.

Aspect 13 is the apparatus of any of aspects 1-4 and 9-12, where the L1 measurement reporting associated with each cell in the L1 or L2 mobility deactivated cell set are based on an activated cell.

Aspect 14 is the apparatus of any of aspects 1-13, further including at least one of a transceiver or an antenna coupled to the at least one processor and configured to receive the CA configuration.

Aspect 15 is an apparatus for communication at a network node, including: a memory; and at least one processor coupled to the memory and, based at least in part on information stored in the memory, the at least one processor is configured to: transmit a carrier aggregation (CA) configuration associated with a layer 1 (L1) or layer 2 (L2) mobility configuration for a user equipment (UE), the L1 or L2 mobility configuration including primary cell (PCell) configurations for multiple cell; and transmit at least one activation or deactivation for the UE of one of the PCell configurations.

Aspect 16 is the apparatus of aspect 15, where the L1 or L2 mobility configuration further includes at least one of an L1 measurement configuration, the at least one processor being further configured to: output an indication of an activated L1 or L2 mobility cell set; and obtain L1 measurements of the UE according to the L1 measurement configuration on a set of deactivated L1 or L2 mobility cells.

Aspect 17 is the apparatus of any of aspects 15-16, where the L1 or L2 mobility configuration further includes at least one special cell (spCell) configuration to be applied when a cell in the set of deactivated L1 or L2 mobility cells is activated as a PCell.

Aspect 18 is the apparatus of any of aspects 15-17, where the at least one activation or deactivation indicates one spCell configuration of the at least one spCell configuration.

Aspect 19 is the apparatus of any of aspects 15-18, where the at least one activation or deactivation includes at least one of: a secondary cell (SCell) activation or deactivation, or a PCell activation or deactivation, the SCell activation or deactivation being separate from the PCell activation or deactivation.

Aspect 20 is the apparatus of any of aspects 15-19, where the PCell activation or deactivation activates an activated SCell in the activated L1 or L2 mobility cell set to be a PCell.

Aspect 21 is the apparatus of any of aspects 15-20, where the PCell activation or deactivation deactivates a previous PCell.

Aspect 22 is the apparatus of any of aspects 15-21, where the PCell activation or deactivation is transmitted via medium access control (MAC) control element (MAC-CE) or downlink control information (DCI), where the MAC-CE or the DCI is associated with a logical channel identifier (LCID) associated with L1 or L2 PCell activation, and including: a first pointer to a cell ID associated with the activated SCell or a first bit corresponding with the activated SCell in a bitmap, a second pointer to a special cell (spCell) configuration associated with the activated SCell or a second bit corresponding with the spCell configuration in the bitmap, or one or more transmission configuration indicator (TCI) states to activate for the activated SCell.

Aspect 23 is the apparatus of any of aspects 15-18, where the at least one activation or deactivation includes at least one of: a first activation or deactivation associated with the activated L1 or L2 mobility cell set or the set of deactivated L1 or L2 mobility cells, or a second activation or deactivation associated with one or more cells not configured for L1 or L2 mobility.

Aspect 24 is the apparatus of any of aspects 15-18 and 23, where the first activation or deactivation jointly controls SCell activation or deactivation and PCell activation and deactivation activating an activated SCell in the activated L1 or L2 mobility cell set to be a PCell.

Aspect 25 is the apparatus of any of aspects 15-18 and 23-24, where the first activation or deactivation is transmitted via medium access control (MAC) control element (MAC-CE) associated with a logical channel identifier (LCID) associated with L1 or L2 PCell activation, and including: a pointer to a cell ID associated with the activated SCell or a bit corresponding with the activated SCell in a bitmap, a pointer to a special cell (spCell) configuration associated with the activated SCell or a bit corresponding with the spCell configuration in the bitmap, or one or more transmission configuration indicator (TCI) states to activate for the activated SCell.

Aspect 26 is the apparatus of any of aspects 15-18 and 23-25, where the L1 or L2 mobility configuration configures at least one of a L1 measurement, a L1 measurement reporting, or a beam management associated with each cell in the activated L1 or L2 mobility cell set and the set of deactivated L1 or L2 mobility cells.

Aspect 27 is the apparatus of any of aspects 15-18 and 23-26, where the L1 measurement reporting associated with each cell in the set of deactivated L1 or L2 mobility cells are based on an activated cell.

Aspect 28 is the apparatus of any of aspects 15-27, further including at least one of a transceiver or an antenna coupled to the at least one processor and configured to transmit the CA configuration.

Aspect 29 is a method of wireless communication for implementing any of aspects 1 to 14.

Aspect 30 is an apparatus for wireless communication including means for implementing any of aspects 1 to 14.

Aspect 31 is a computer-readable medium storing computer executable code, where the code when executed by a processor causes the processor to implement any of aspects 1 to 14.

Aspect 32 is a method of wireless communication for implementing any of aspects 15 to 28.

Aspect 33 is an apparatus for wireless communication including means for implementing any of aspects 15 to 28.

Aspect 34 is a computer-readable medium storing computer executable code, where the code when executed by a processor causes the processor to implement any of aspects 15 to 28.

What is claimed is:

1. An apparatus for communication at a user equipment (UE), comprising:
   memory; and
   at least one processor coupled to the memory and, based at least in part on information stored in the memory, the at least one processor is configured to:
   receive a carrier aggregation (CA) configuration associated with a layer 1 (L1) or layer 2 (L2) mobility configuration from a network node, the L1 or L2 mobility configuration including primary cell (PCell) configurations for multiple cells; and
   receive at least one activation or deactivation of one of the PCell configurations from the network node.

2. The apparatus of claim 1, wherein the L1 or L2 mobility configuration further includes at least one of an L1 measurement configuration, wherein the at least one processor is further configured to:
   receive an indication of an activated L1 or L2 mobility cell set;
   perform L1 measurements according to the L1 measurement configuration on a set of deactivated L1 or L2 mobility cells; and
   report the L1 measurements on an activated cell from the activated L1 or L2 mobility cell set.

3. The apparatus of claim 2, wherein the L1 or L2 mobility configuration further comprises at least one special cell (spCell) configuration to be applied when a cell in the set of deactivated L1 or L2 mobility cells is activated as a PCell.

4. The apparatus of claim 3, wherein the at least one activation or deactivation indicates one spCell configuration of the at least one spCell configuration.

5. The apparatus of claim 1, wherein the at least one activation or deactivation comprises:
a secondary cell (SCell) activation or deactivation activating or deactivating an SCell for a data flow or a control flow, or
a PCell activation or deactivation, the SCell activation or deactivation being separate from the PCell activation or deactivation.

6. The apparatus of claim 5, wherein the PCell activation or deactivation activates an activated SCell in a L1 or L2 mobility activated cell set to be a PCell.

7. The apparatus of claim 6, wherein the PCell activation or deactivation deactivates a previous PCell.

8. The apparatus of claim 6, wherein the PCell activation or deactivation is received via medium access control (MAC) control element (MAC-CE) or downlink control information (DCI), wherein the MAC-CE or the DCI is associated with a logical channel identifier (LCID) associated with L1 or L2 PCell activation, and comprising: a first pointer to a cell ID associated with the activated SCell or a first bit corresponding with the activated SCell in a bitmap, a second pointer to a special cell (spCell) configuration associated with the activated SCell or a second bit corresponding with the spCell configuration in the bitmap, or one or more transmission configuration indicator (TCI) states to activate for the activated SCell.

9. The apparatus of claim 1, wherein the at least one activation or deactivation comprises at least one of:
a first activation or deactivation associated with an L1 or L2 mobility activated cell set or an L1 or L2 mobility deactivated cell set, or
a second activation or deactivation associated with one or more cells not configured for L1 or L2 mobility.

10. The apparatus of claim 9, wherein the first activation or deactivation jointly controls SCell activation or deactivation activating or deactivating an SCell for a data flow or a control flow and PCell activation and deactivation activating the activated SCell in the L1 or L2 mobility activated cell set to be a PCell.

11. The apparatus of claim 10, wherein the first activation or deactivation is received via medium access control (MAC) control element (MAC-CE) associated with a logical channel identifier (LCID) associated with L1 or L2 PCell activation, and comprising: a first pointer to a cell ID associated with the activated SCell or a first bit corresponding with the activated SCell in a bitmap, a second pointer to a special cell (spCell) configuration associated with the activated SCell or a second bit corresponding with the spCell configuration in the bitmap, or one or more transmission configuration indicator (TCI) states to activate for the activated SCell.

12. The apparatus of claim 1, wherein the L1 or L2 mobility configuration configures at least one of a L1 measurement, a L1 measurement reporting, or a beam management associated with each cell in an L1 or L2 mobility activated cell set and an L1 or L2 mobility deactivated cell set.

13. The apparatus of claim 12, wherein the L1 measurement reporting associated with each cell in the L1 or L2 mobility deactivated cell set are based on an activated cell.

14. The apparatus of claim 1, further comprising at least one of a transceiver or an antenna coupled to the at least one processor and configured to receive the CA configuration.

15. An apparatus for communication at a network node, comprising:
memory; and
at least one processor coupled to the memory and, based at least in part on information stored in the memory, the at least one processor is configured to:
transmit a carrier aggregation (CA) configuration associated with a layer 1 (L1) or layer 2 (L2) mobility configuration for a user equipment (UE), the L1 or L2 mobility configuration including primary cell (PCell) configurations for multiple cell; and
transmit at least one activation or deactivation for the UE of one of the PCell configurations.

16. The apparatus of claim 15, wherein the L1 or L2 mobility configuration further includes at least one of an L1 measurement configuration, the at least one processor being further configured to:
output an indication of an activated L1 or L2 mobility cell set; and
obtain L1 measurements of the UE according to the L1 measurement configuration on a set of deactivated L1 or L2 mobility cells.

17. The apparatus of claim 16, wherein the L1 or L2 mobility configuration further comprises at least one special cell (spCell) configuration to be applied when a cell in the set of deactivated L1 or L2 mobility cells is activated as a PCell.

18. The apparatus of claim 17, wherein the at least one activation or deactivation indicates one spCell configuration of the at least one spCell configuration.

19. The apparatus of claim 18, wherein the at least one activation or deactivation comprises at least one of:
a first activation or deactivation associated with the activated L1 or L2 mobility cell set or the set of deactivated L1 or L2 mobility cells, or
a second activation or deactivation associated with one or more cells not configured for L1 or L2 mobility.

20. The apparatus of claim 19, wherein the first activation or deactivation jointly controls SCell activation or deactivation activating or deactivating an SCell for a data flow or a control flow and PCell activation and deactivation activating the activated SCell in the activated L1 or L2 mobility cell set to be a PCell.

21. The apparatus of claim 20, wherein the first activation or deactivation is transmitted via medium access control (MAC) control element (MAC-CE) associated with a logical channel identifier (LCID) associated with L1 or L2 PCell activation, and comprising: a pointer to a cell ID associated with the activated SCell or a bit corresponding with the activated SCell in a bitmap, a pointer to a special cell (spCell) configuration associated with the activated SCell or a bit corresponding with the spCell configuration in the bitmap, or one or more transmission configuration indicator (TCI) states to activate for the activated SCell.

22. The apparatus of claim 18, wherein the L1 or L2 mobility configuration configures at least one of a L1 measurement, a L1 measurement reporting, or a beam management associated with each cell in the activated L1 or L2 mobility cell set and the set of deactivated L1 or L2 mobility cells.

23. The apparatus of claim 22, wherein the L1 measurement reporting associated with each cell in the set of deactivated L1 or L2 mobility cells are based on an activated cell.

24. The apparatus of claim 16, wherein the at least one activation or deactivation comprises at least one of:
- a secondary cell (SCell) activation or deactivation activating or deactivating an SCell for a data flow or a control flow, or
- a PCell activation or deactivation, the SCell activation or deactivation being separate from the PCell activation or deactivation.

25. The apparatus of claim 24, wherein the PCell activation or deactivation activates an activated SCell in the activated L1 or L2 mobility cell set to be a PCell.

26. The apparatus of claim 25, wherein the PCell activation or deactivation deactivates a previous PCell.

27. The apparatus of claim 25, wherein the PCell activation or deactivation is transmitted via medium access control (MAC) control element (MAC-CE) or downlink control information (DCI), wherein the MAC-CE or the DCI is associated with a logical channel identifier (LCID) associated with L1 or L2 PCell activation, and comprising: a first pointer to a cell ID associated with the activated SCell or a first bit corresponding with the activated SCell in a bitmap, a second pointer to a special cell (spCell) configuration associated with the activated SCell or a second bit corresponding with the spCell configuration in the bitmap, or one or more transmission configuration indicator (TCI) states to activate for the activated SCell.

28. The apparatus of claim 15, further comprising at least one of a transceiver or an antenna coupled to the at least one processor and configured to transmit the CA configuration.

29. A method for communication at a user equipment (UE), comprising:
- receiving a carrier aggregation (CA) configuration associated with a layer 1 (L1) or layer 2 (L2) mobility configuration from a network node, the L1 or L2 mobility configuration including primary cell (PCell) configurations for multiple cells; and
- receiving at least one activation or deactivation of one of the PCell configurations from the network node.

30. A method for communication at a network node, comprising:
- transmitting a carrier aggregation (CA) configuration associated with a layer 1 (L1) or layer 2 (L2) mobility configuration for a user equipment (UE), the L1 or L2 mobility configuration including primary cell (PCell) configurations for multiple cell; and
- transmitting at least one activation or deactivation for the UE of one of the PCell configurations.

* * * * *